US012734802B2

(12) United States Patent
Komamiya et al.

(10) Patent No.: US 12,734,802 B2
(45) Date of Patent: Sep. 15, 2026

(54) LIQUID EJECTING HEAD AND LIQUID EJECTING APPARATUS

(71) Applicant: CANON KABUSHIKI KAISHA, Tokyo (JP)

(72) Inventors: Yumi Komamiya, Kanagawa (JP); Shingo Okushima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 18/396,827

(22) Filed: Dec. 27, 2023

(65) Prior Publication Data

US 2024/0208218 A1 Jun. 27, 2024

(30) Foreign Application Priority Data

Dec. 27, 2022 (JP) ................................ 2022-209970

(51) Int. Cl.

| | |
|---|---|
| ***B41J 2/14*** | (2006.01) |
| ***B41J 2/175*** | (2006.01) |
| ***B41J 2/18*** | (2006.01) |

(52) U.S. Cl.

CPC ......... *B41J 2/1404* (2013.01); *B41J 2/14072* (2013.01); *B41J 2/1408* (2013.01); *B41J 2/14145* (2013.01); *B41J 2/17596* (2013.01); *B41J 2/18* (2013.01); *B41J 2202/12* (2013.01)

(58) Field of Classification Search

CPC .... B41J 2/1408; B41J 2/1404; B41J 2/14072; B41J 2/14145; B41J 2/17596; B41J 2/18; B41J 2202/12

See application file for complete search history.

(56) References Cited

U.S. PATENT DOCUMENTS

| | | | |
|---|---|---|---|
| 10,688,792 | B2 | 6/2020 | Nakagawa |
| 10,987,921 | B2 | 4/2021 | Iwasaki et al. |
| 11,192,363 | B2 | 12/2021 | Ishida et al. |

(Continued)

FOREIGN PATENT DOCUMENTS

| | | | |
|---|---|---|---|
| CN | 109203716 | A | 1/2019 |
| CN | 110315847 | A | 10/2019 |

(Continued)

OTHER PUBLICATIONS

Office Action dated May 29, 2026, in Chinese Patent Application No. 202311782298.1.

*Primary Examiner* — Geoffrey S Mruk
(74) *Attorney, Agent, or Firm* — Venable LLP

(57) ABSTRACT

A liquid ejecting head includes a substrate including ejection openings configured to eject liquid; a flow-path member supporting the substrate and having a supply flow path that supplies the substrate with liquid, on one side with respect to a predetermined direction intersecting the arrangement direction of the ejection openings, and a collection flow path that collects liquid from the substrate, on the other side; and a heating unit that heats an ejection region including the liquid ejection openings in the substrate. On sides of the ejection region of the substrate in the predetermined direction, the collection flow path is located on a side where the distance between the ejection region and a side of the substrate in the predetermined direction is longer and the supply flow path is located on a side where the distance between the ejection region and a side of the substrate in the predetermined direction is shorter.

14 Claims, 13 Drawing Sheets

(56) References Cited

U.S. PATENT DOCUMENTS

| | | | |
|---|---|---|---|
| 11,760,083 | B2 | 9/2023 | Komamiya et al. |
| 2019/0009577 | A1* | 1/2019 | Hirokawa ............ B41J 2/04563 |

FOREIGN PATENT DOCUMENTS

| | | | |
|---|---|---|---|
| CN | 110843342 | A | 2/2020 |
| CN | 111845079 | A | 10/2020 |
| JP | 2022-073137 | A | 5/2022 |

* cited by examiner

LIQUID EJECTING HEAD AND LIQUID EJECTING APPARATUS

BACKGROUND OF THE INVENTION

Field of the Invention

The present invention relates to a liquid ejecting head and a liquid ejecting apparatus.

Description of the Related Art

Japanese Patent Laid-Open No. 2022-073137 discloses a printing apparatus that includes an element substrate including heat generation elements for heating ink as print elements and in which these heat generation elements heat ink to generate bubbles in ink, and this foaming pressure ejects ink through ejection openings. In addition, in Japanese Patent Laid-Open No. 2022-073137, sub-heaters or heat generation elements heat ink in the element substrate to adjust the temperature of the ink to a set temperature, thereby reducing variations in ink ejection volume from the ejection openings caused by ink temperature. In other words, the temperature of supplied ink is increased by using the sub-heaters and the heat generation elements to reduce variations in ink ejection volume.

In the technique disclosed in Japanese Patent Laid-Open No. 2022-073137, the temperature of the ink to be supplied to the element substrate is lower than the ink in the element substrate. Hence, in the ink in the element substrate, the closer to the ink supply portions, the lower the temperature. This can cause variations between ink ejection volume from ejection openings closer to the supply portions and ink ejection volume from ejection openings away from the supply portions.

SUMMARY OF THE INVENTION

The present invention has been made in light of the above issue, and an object thereof is to provide a technique to reduce variations in liquid ejection volume caused by the temperature of liquid.

In the first aspect of the present invention, there is provided a liquid ejecting head including:

- a substrate including an ejection opening row including a plurality of ejection openings configured to eject liquid, supply openings to supply liquid to the plurality of ejection openings, collection openings to collect liquid not ejected through the plurality of ejection openings, and energy generation elements configured to generate energy to eject liquid through the ejection openings;
- a flow-path member supporting the substrate and having a supply flow path that is located on one side of the supported substrate in a first direction intersecting a direction in which the ejection opening row extends and that supplies liquid to the supply openings and a collection flow path that is located on the other side of the supported substrate in the first direction and that collects liquid from the collection openings; and
- a heating unit configured to heat an ejection region including the ejection openings in the substrate,
- wherein, on both sides of the ejection region of the substrate in the first direction, the collection flow path is located on a side on which the distance between the ejection region and a side of the substrate in the first direction is relatively long, and the supply flow path is located on a side on which the distance between the ejection region and a side of the substrate in the first direction is relatively short.

In the second aspect of the present invention, there is provided a liquid ejecting head including:

- a substrate including an ejection opening row including a plurality of ejection openings configured to eject liquid, supply openings to supply liquid to the plurality of ejection openings, collection openings to collect liquid not ejected through the plurality of ejection openings, and energy generation elements configured to generate energy to eject liquid through the ejection openings;
- a flow-path member supporting the substrate and having a supply flow path that is located on one side of the supported substrate in a first direction intersecting a direction in which the ejection opening row extends and that supplies liquid to the supply openings and a collection flow path that is located on the other side of the supported substrate in the first direction and that collects liquid from the collection openings; and
- a heating unit configured to heat an ejection region in which the ejection openings are formed in the substrate,
- wherein, the substrate;
  - has, on both sides of the ejection region in the first direction, two non-ejection regions not including the ejection openings and formed such that a heating effect by the heating unit is different in each of the non-ejection regions, and
  - is located on the flow-path member such that the non-ejection region, the heating effect of which is relatively low, is located on the one side in the first direction on which the supply flow path is formed, and that the non-ejection region, the heating effect of which is relatively high, is located on the other side in the first direction on which the collection flow path is formed.

In the third aspect of the present invention, there is provided a liquid ejecting apparatus including:

- a liquid ejecting head including a substrate including an ejection opening row including a plurality of ejection openings configured to eject liquid, supply openings to supply liquid to the plurality of ejection openings, collection openings to collect liquid not ejected through the plurality of ejection openings, and energy generation elements configured to generate energy to eject liquid through the ejection openings, a flow-path member supporting the substrate and having a supply flow path that is located on one side of the supported substrate in a first direction intersecting a direction in which the ejection opening row extends and that supplies liquid to the supply openings and a collection flow path that is located on the other side of the supported substrate in the first direction and that collects liquid from the collection openings, and a heating unit configured to heat an ejection region including the ejection openings in the substrate, in which, on both sides of the ejection region of the substrate in the first direction, the collection flow path is located on a side on which the distance between the ejection region and a side of the substrate in the first direction is relatively long, and the supply flow path is located on a side on which the distance between the ejection region and a side of the substrate in the first direction is relatively short; and
- a circulation system configured to supply liquid from a tank for storing liquid to the liquid ejecting head and transfer liquid collected from the liquid ejecting head to the tank.

With the present invention, it is possible to reduce variations in liquid ejection volume caused by the temperature of liquid.

Further features of the present invention will become apparent from the following description of exemplary embodiments with reference to the attached drawings.

DESCRIPTION OF THE EMBODIMENTS

Hereinafter, examples of a liquid ejecting head and a liquid ejecting apparatus according to the present invention will be described in detail with reference to the attached drawings. Note that the following embodiment is not intended to limit the present invention, and a combination of all the features described in the present embodiment is not necessarily indispensable for the solution of the present invention. The positions, shapes, and the like of the constituents described in the present embodiment are mere examples and are not intended to limit the scope of the present invention only to those examples.

(Configuration of Printing Apparatus)

Figure 1:
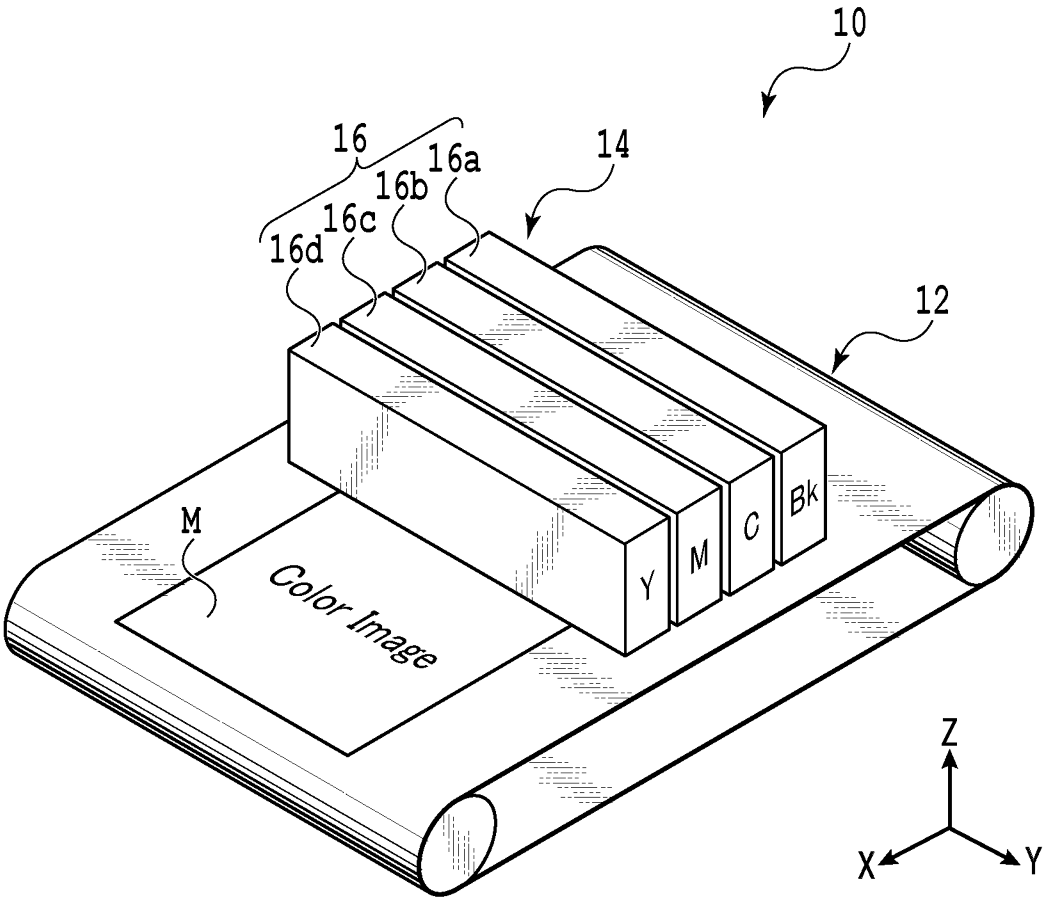
FIG. 1 is a schematic configuration diagram of a printing apparatus which is a liquid ejecting apparatus.

First, the configuration of a liquid ejecting apparatus including a liquid ejecting head according to the present embodiment will be described. In the following description of the present specification, an inkjet printing apparatus (hereinafter simply referred to as "printing apparatus") that performs printing by ejecting ink onto print media by an inkjet method is taken as an example of a liquid ejecting apparatus. FIG. 1 is a schematic configuration diagram of a printing apparatus. Note that liquid ejecting apparatuses to which the present embodiment is applicable are not limited to the printing apparatus illustrated in FIG. 1. In other words, the present embodiment is applicable to various kinds of apparatuses that include various kinds of publicly-known print functions to perform printing by ejecting liquid. Note that in the present specification, directions are indicated by using the X direction, the Y direction, and the Z direction orthogonal to one another. Each direction is defined as a direction from a first side toward a second side.

The printing apparatus 10 illustrated in FIG. 1 includes a conveyance portion 12 that conveys a print medium M and a print portion 14 that performs printing by ejecting ink onto the print medium M being conveyed by the conveyance portion 12. The conveyance portion 12 has a configuration in which, for example, a print medium M is placed on an endless belt provided in a tensioned state, and the belt is rotated to convey the print medium M in the X direction. Note that the configuration of the conveyance portion 12 of the printing apparatus 10 is not limited to the one above and may utilize various kinds of publicly-known techniques. The print medium M is not limited to a cut sheet as in FIG. 1 and may be roll paper, or may be a film or the like besides print paper.

The print portion 14 includes a plurality of liquid ejecting heads 16. In the present embodiment, the print portion 14 includes a liquid ejecting head 16*a* that ejects black (Bk) ink, a liquid ejecting head 16*b* that ejects cyan (C) ink, a liquid ejecting head 16*c* that ejects magenta (M) ink, and a liquid ejecting head 16*d* that ejects yellow (Y) ink. The four liquid ejecting heads 16 extend in the Y direction intersecting (orthogonal to, in the present embodiment) the X direction and are located side by side in the X direction. Each liquid ejecting head 16 includes a plurality of ejection opening rows each including a plurality of ejection openings arranged in the Y direction and configured to eject ink, on the surface facing the print medium M which is conveyed by the conveyance portion 12. The kinds of ink ejected by the liquid ejecting heads 16 and the number of kinds are not limited to the kinds of ink and the number of kinds described above. In addition, the liquid ejecting heads 16 are not limited to ones that eject only ink, and the liquid ejecting heads 16 may have a configuration capable of ejecting various kinds of liquid including a treatment liquid for performing a specified treatment on ink ejected on the print medium M.

(Configuration of Control System of Printing Apparatus)

Figure 2:
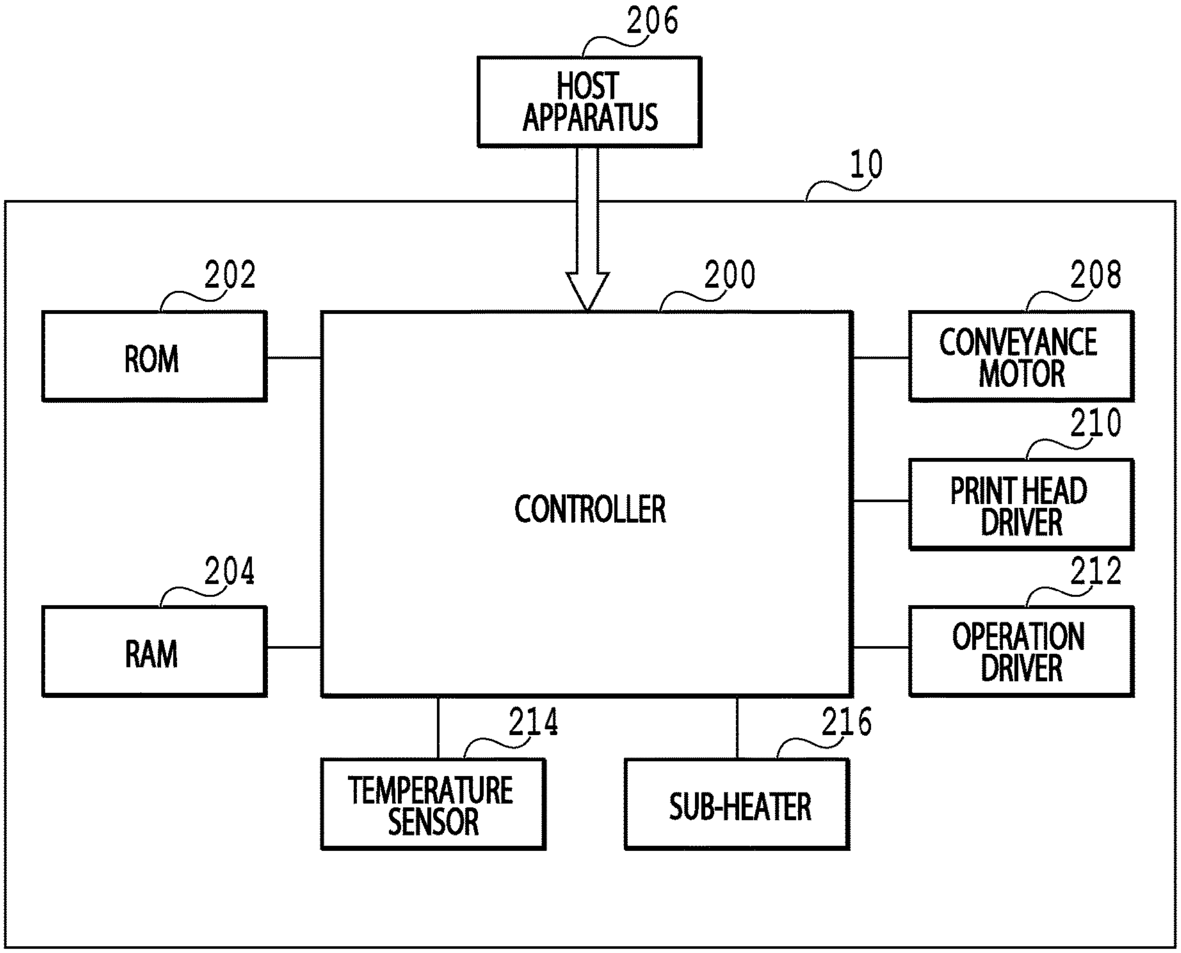
FIG. 2 is a block diagram illustrating the configuration of the control system of the printing apparatus.

Next, the configuration of the control system of the printing apparatus 10 will be described. FIG. 2 is a block diagram illustrating the configuration of the control system of the printing apparatus 10.

The entire operation of the printing apparatus 10 is controlled by a controller 200. The printing apparatus 10 includes the controller 200, ROM 202, and RAM 204. The controller 200 includes, for example, a CPU or the like and performs operation control or the like of each component in the printing apparatus 10 according to various programs. The ROM 202 functions as memory that stores various control programs executed by the controller 200 and processing programs for image data. The RAM 204 is memory that temporarily stores various kinds of data used to control the printing apparatus 10 and also functions as a work area used for the controller 200 to execute various processes. The controller 200 is connected to an external apparatus such as a host apparatus 206 and the like.

The controller 200 is connected to a conveyance-motor driver 208 and controls the conveyance distance and the conveyance speed of the print medium M in the conveyance portion 12 via the conveyance-motor driver 208. The controller 200 is also connected to a head driver 210 and controls ink ejection from each liquid ejecting head 16 via the head driver 210. In addition, the controller 200 is connected to an operation driver 212 and controls ink circulation of a circulation system 300 (described later) via the operation driver 212. For easier understanding, FIG. 2 collectively depicts drivers each of which controls a corresponding component used in ink circulation control in the circulation system 300, as one driver. Further, the controller 200 is connected to temperature sensors 214 and sub-heaters 216 provided in each element substrate 400 (described later) in the liquid ejecting head 16. The controller 200 controls driving of the sub-heaters 216 according to detection results of the temperature sensors 214.

The controller 200 performs image processing on the image data outputted from the host apparatus 206, for example, according to a processing program and parameters stored in the ROM 202 to generate data for ejecting ink from the liquid ejecting heads 16. Then, the controller 200 drives the liquid ejecting heads 16 according to the generated data to eject ink at a specified frequency. In a case where the liquid ejecting heads 16 eject ink, the controller 200 drives the conveyance portion 12 to cause it to convey the print medium M at a speed corresponding to the drive frequency. With this operation, an image corresponding to the image data inputted from the host apparatus 206 is printed onto the print medium M.

Although details will be described later, each liquid ejecting head 16 has an array of a plurality of element substrates 400. Each element substrate 400 has a plurality of temperature sensors 214 for detecting the temperature of the element substrate 400 and a plurality of sub-heaters 216 for heating the element substrate 400. For easier understanding, FIG. 2 collectively depicts the plurality of temperature sensors 214 and the plurality of sub-heaters 216 as one for each. Thus, the controller 200 drives the sub-heaters 216 according to the detection results of the temperature sensors 214 to maintain the temperature of each element substrate 400 within a specified range.

(Circulation System)

Figure 3:
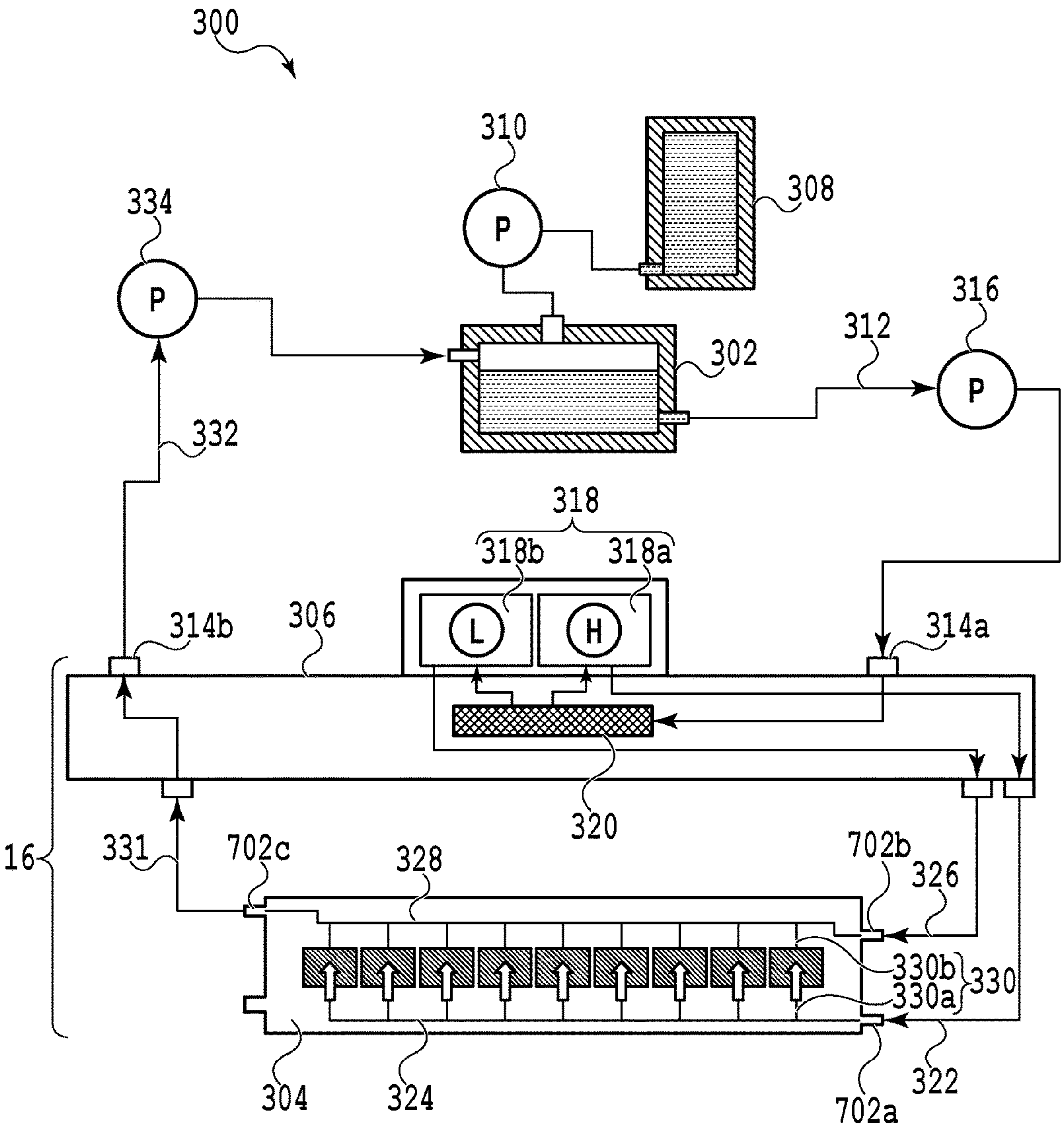
FIG. 3 is a schematic configuration diagram of a circulation system.

The printing apparatus 10 includes a circulation system for circulating ink in a circulation path including the liquid ejecting head 16 to prevent ink thickening in the ejection openings not performing printing among the ejection openings provided in the liquid ejecting head 16 and the pressure chambers associated with these ejection openings not performing printing. FIG. 3 is a diagram schematically illustrating the circulation system 300 in the printing apparatus 10. Note that the circulation system 300 illustrated in FIG. 3 is provided in each liquid ejecting head 16. Specifically, in the present embodiment, the printing apparatus 10 has a circulation system 300 for each of the four liquid ejecting heads 16.

The circulation system 300 includes a buffer tank 302 storing a corresponding kind of ink and an ejection part 304 capable of ejecting ink. The circulation system 300 also includes a supply part 306 that supplies the ink supplied from the buffer tank 302 to the ejection part 304 and transfers the ink collected from the ejection part 304 to the buffer tank. In the present embodiment, the configuration including the ejection part 304 and the supply part 306 is located in the liquid ejecting head 16, and the buffer tank 302 and pumps or the like for ink circulation are located at specified positions in the printing apparatus 10.

The buffer tank 302 has an atmospheric communication opening (not illustrated) for connecting the inside and the outside of the tank. This configuration enables the buffer tank 302 to discharge bubbles in the ink stored in the tank to the outside. The buffer tank 302 is connected to a main tank 308 storing a corresponding kind of ink, and a refilling pump 310 is driven to supply ink in the main tank 308 to the buffer tank 302. For example, in a case where ink is consumed by ejecting (discharging) ink from the liquid ejecting head 16, such as printing, suction recovery, and the like, the refilling pump 310 is driven to supply an amount of ink corresponding to the amount of the consumed ink from the main tank 308 to the buffer tank 302.

The buffer tank 302 is connected to a liquid connection portion 314*a* of the supply part 306 via a supply path 312. This supply path 312 is provided with a first circulation pump 316, and the first circulation pump 316 is driven to supply ink in the buffer tank 302 through the supply path 312 to the supply part 306. The supply part 306 includes a negative-pressure control part 318, and the ink supplied to the supply part 306 is transferred through a filter 320 to the negative-pressure control part 318. After that, the ink transferred to the negative-pressure control part 318 is transferred to the ejection part 304.

The negative-pressure control part 318 has a function of maintaining the pressure downstream of the negative-pressure control part 318, in other words, the pressure on the ejection part 304 side at a preset pressure even in a case where the flow rate of ink in the circulation system varies due to the difference in print duty. The negative-pressure control part 318 includes two negative-pressure adjustment portions having control pressures set to be different from each other. Of the two negative-pressure adjustment portions, a negative-pressure adjustment portion 318*a* having a relatively high set pressure transfers ink through a supply path 322 to a common supply flow path 324 of the ejection part 304. A negative-pressure adjustment portion 318*b* having a relatively low set pressure transfers ink through a supply path 326 to a common collection flow path 328 of the ejection part 304.

The ejection part 304 includes the common supply flow path 324, the common collection flow path 328, and individual flow paths 330. The common supply flow path 324 is a flow path through which the ink to be supplied to each element substrate 400 (described later) flows, and the common collection flow path 328 is a flow path through which the ink flowing out of (collected from) each element substrate 400 flows. Each individual flow path 330 includes an individual supply flow path 330*a* and an individual collection flow path 330*b*. The individual supply flow path 330*a* is configured to guide ink from the common supply flow path 324 to the element substrate 400, and the individual collection flow path 330*b* is configured to guide the ink flowing out of the element substrate 400 to the common collection flow path 328.

The common collection flow path 328 of the ejection part 304 is connected to the supply part 306 via a collection path 331, and the supply part 306 is connected to the buffer tank 302 via a collection path 332. The collection path 332 is connected to a liquid connection portion 314*b* of the supply part 306. The collection path 332 is provided with a second circulation pump 334, and the second circulation pump 334 is driven to suck ink from the common collection flow path 328 and send out (collect) the sucked ink into the buffer tank 302 through the collection path 332.

Each element substrate 400 communicates with the common supply flow path 324 and the common collection flow path 328 through the corresponding individual flow path 330. Thus, part of the ink supplied to the ejection part 304 via the supply part 306 by the first circulation pump 316 flows from the common supply flow path 324 through the internal flow paths of the element substrates 400 to the common collection flow path 328. This is because ink is transferred from the negative-pressure adjustment portion 318*a* to the common supply flow path 324, and ink is transferred from the negative-pressure adjustment portion 318*b* to the common collection flow path 328, which causes a pressure difference between the two flow paths. This is also because ink is sucked (collected) by the second circulation pump 334 only from the common collection flow path 328.

As described above, the ejection part 304 has the flow of ink passing through the common collection flow path 328 and the flow of ink passing from the inside of the common supply flow path 324 through each element substrate 400 toward the common collection flow path 328. Thus, heat generated in each element substrate 400 (heat generated by the sub-heaters 216 and heat generation elements 914) is released to the outside of the element substrate 400 along with the flow of ink from the common supply flow path 324 to the common collection flow path 328.

Since the printing apparatus 10 includes the circulation system 300, in the case where the liquid ejecting head 16 is performing printing, the flow of ink occurs also in the ejection openings not ejecting ink and the pressure chambers associated with these ejection openings. Thus, it is possible to prevent thickening of ink in these ejection openings and pressure chambers. This configuration enables thickened ink and foreign objects in ink to be discharged to the common collection flow path 328, which enables the liquid ejecting head 16 to perform high-speed and high-quality printing.

(Configuration of Liquid Ejecting Head)

<Overall Configuration of Liquid Ejecting Head>

Figure 4A:
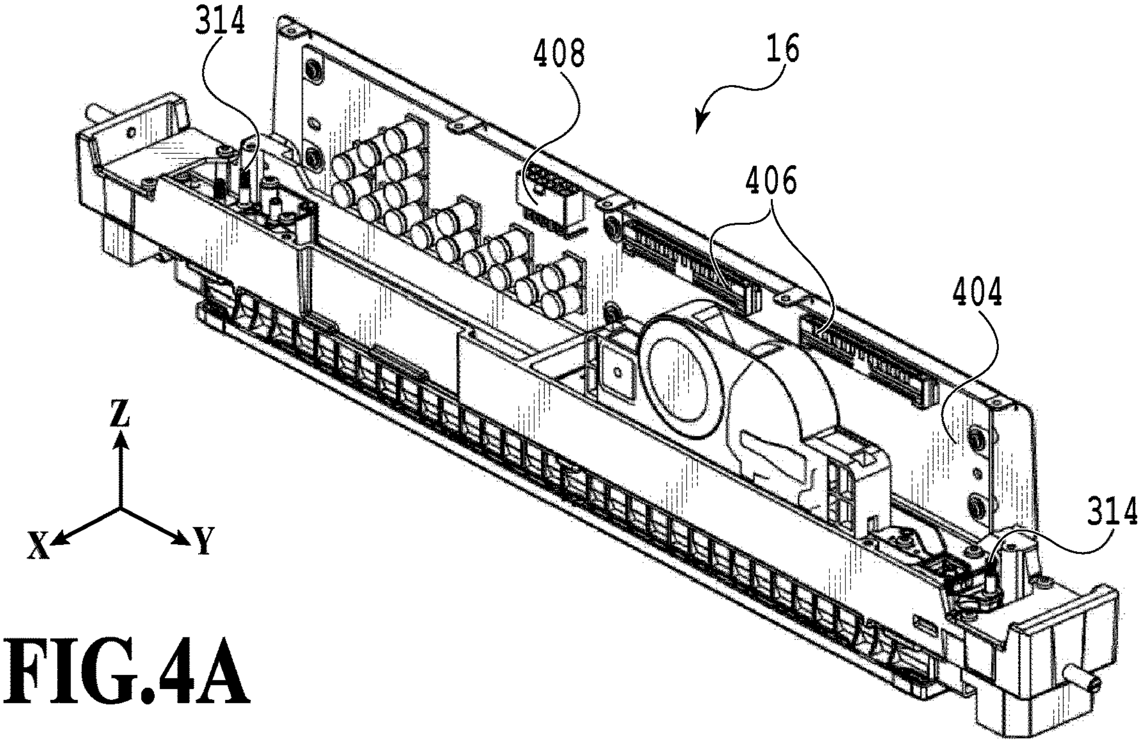
FIGS. 4A and 4B are perspective configuration diagrams of a liquid ejecting head.
Figure 4B:
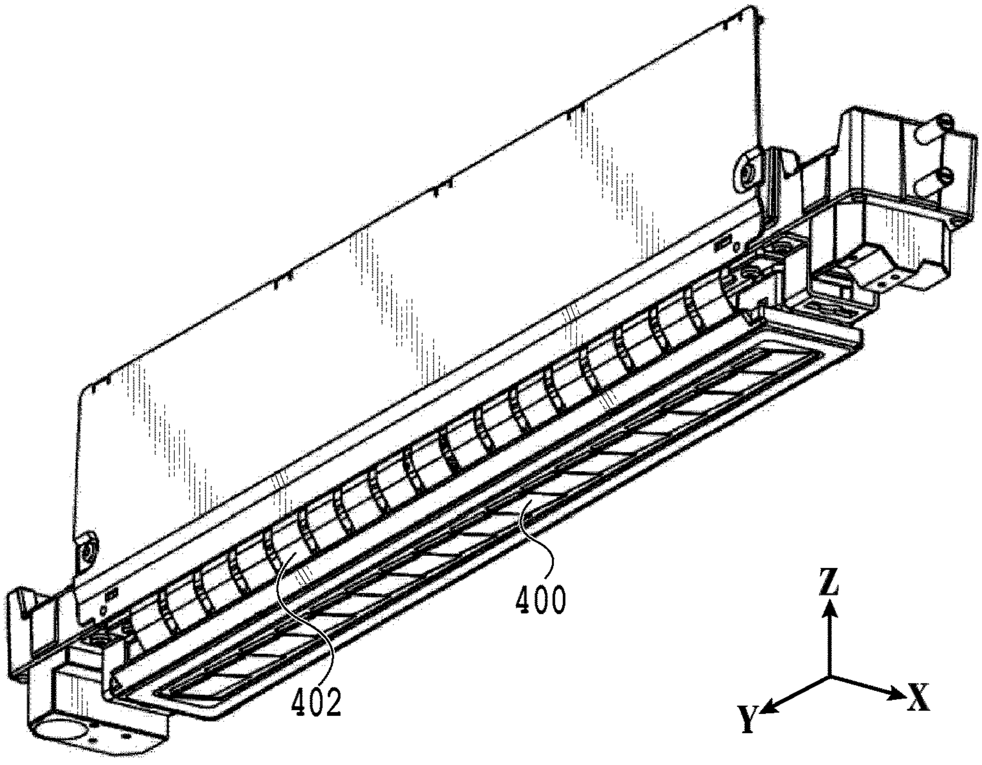
Figure 5:
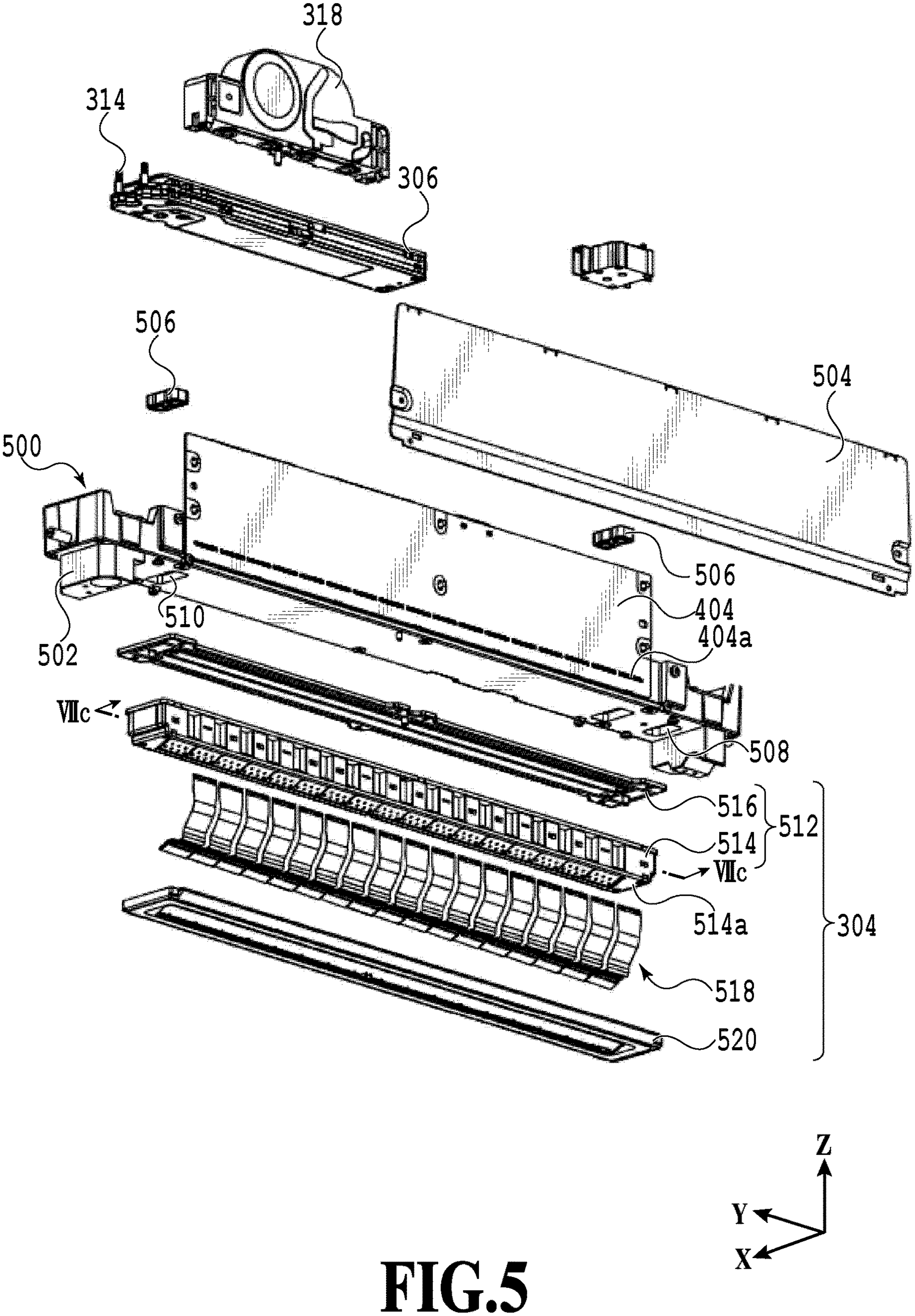
FIG. 5 is an exploded view of the liquid ejecting head.

Next, the liquid ejecting head 16 will be described. First, the overall configuration of the liquid ejecting head 16 will be described. FIGS. 4A and 4B are schematic configuration diagrams of the liquid ejecting head. FIG. 4A is a perspective view from the second side in the Z direction (from above), and FIG. 4B is a perspective view from the first side in the Z direction (from below). FIG. 5 is an exploded perspective view of the liquid ejecting head 16. For easier understanding, the directions used in the following description of the liquid ejecting head are based on the directions of the liquid ejecting head 16 attached to the printing apparatus 10.

The liquid ejecting head 16 extends in the Y direction (see FIG. 4A). In the state in which the liquid ejecting head 16 is attached to the printing apparatus 10, the surface facing the print medium M, which is conveyed by the conveyance portion 12, has a plurality of element substrates 400 capable of ejecting ink and arranged in the Y direction in a straight line (see FIG. 4B). The liquid ejecting head 16 is a so-called line-type liquid ejecting head.

The liquid ejecting head 16 includes signal input terminals 406 and power supply terminals 408 electrically connected to the element substrates 400 via flexible wiring boards 402 and an electrical wiring board 404. The signal input terminals 406 and the power supply terminals 408 are electrically connected to the controller 200 of the printing apparatus 10 and are for supplying the element substrates 400 with ejection driving signals and electric power necessary for ejection. By passing the wiring through electrical circuits in the electrical wiring board 404, the number of signal input terminals 406 and the number of power supply terminals 408 can be smaller than the number of element substrates 400. This configuration reduces the number of electrical connections that need to be detached in a case of attaching or detaching the liquid ejecting head 16 to or from the printing apparatus 10.

The liquid ejecting head 16 is connected to the supply path 312 and the collection path 332 at liquid connection portions 314 (314*a* and 314*b* in FIG. 3) located near both end portions of the liquid ejecting head 16 in the Y direction. With this configuration, ink is supplied to the liquid ejecting head 16 through the supply path 312 and ink is collected into the collection path 332.

In the liquid ejecting head 16, the ejection part 304, the supply part 306, and the electrical wiring board 404 are attached to a housing 500 (see FIG. 5). The supply part 306 includes the liquid connection portions 314, and the supply part 306 also contains the filter 320 (see FIG. 3) for removing foreign objects in the ink supplied from the supply path 312 via a liquid connection portion 314. The ink having passed through the filter 320 is supplied to the negative-pressure control part 318 connected to the supply part 306.

The negative-pressure control part 318 includes pressure adjustment valves and is configured to attenuate significantly the pressure loss variation outside the liquid ejecting head 16 in the circulation system 300 that occurs along with the variation of the flow rate of ink, by the functions of the valves, spring members, and the like located inside. This configuration stabilizes the variation of the negative pressure in the ejection part 304 downstream of the negative-pressure control part 318 within a certain range. The negative-pressure control part 318 has two pressure adjustment valves (the negative-pressure adjustment portions 318*a* and 318*b*) inside, and different control pressures are set in those valves. Of the two pressure adjustment valves, the high pressure valve is connected to the common supply flow path 324 of the ejection part 304, and the low pressure valve is connected to the common collection flow path 328 of the ejection part 304.

The housing 500 includes an ejection-part support portion 502 that supports the ejection part 304 and an electrical-wiring-board support portion 504 that supports the electrical wiring board 404. The housing 500 provides the liquid ejecting head 16 with sufficient rigidity. The electrical-wiring-board support portion 504 is fixed to the ejection-part support portion 502 by screwing. The ejection-part support portion 502 has openings 508 and 510 into which joint rubbers 506 are inserted. The ink supplied from the supply part 306 is guided through a joint rubber 506 to a flow-path member 512 (described later) included in the ejection part 304. In other words, these joint rubbers 506 correspond to the supply paths 322 and 326 and the collection path 331 in FIG. 3.

The ejection part 304 includes the flow-path member 512 including a first flow-path member 514 and a second flow-path member 516; ejection modules 518 each including the element substrate 400; and a cover member 520 that protects the outer peripheries of the element substrates 400. As described later, the ejection module 518 includes the element substrate 400 and the flexible wiring board 402. The element substrate 400 of the ejection module 518 is joined to a joining surface (the bottom surface) 514*a* of the first flow-path member 514 with an adhesive, and the end portion of the flexible wiring board 402 is electrically connected to connection terminals 404*a* of the electrical wiring board 404.

The flow-path member 512 includes layers of the first flow-path member 514 and the second flow-path member 516. The flow-path member 512 has a flow-path configuration in which the ink supplied from the supply part 306 is distributed to each ejection module 518, and the ink flowing back from each ejection module 518 is returned to the supply part 306. The flow-path member 512 is fixed to the ejection-part support portion 502 by screwing.

<Configuration of Ejection Module>

Figure 6A:
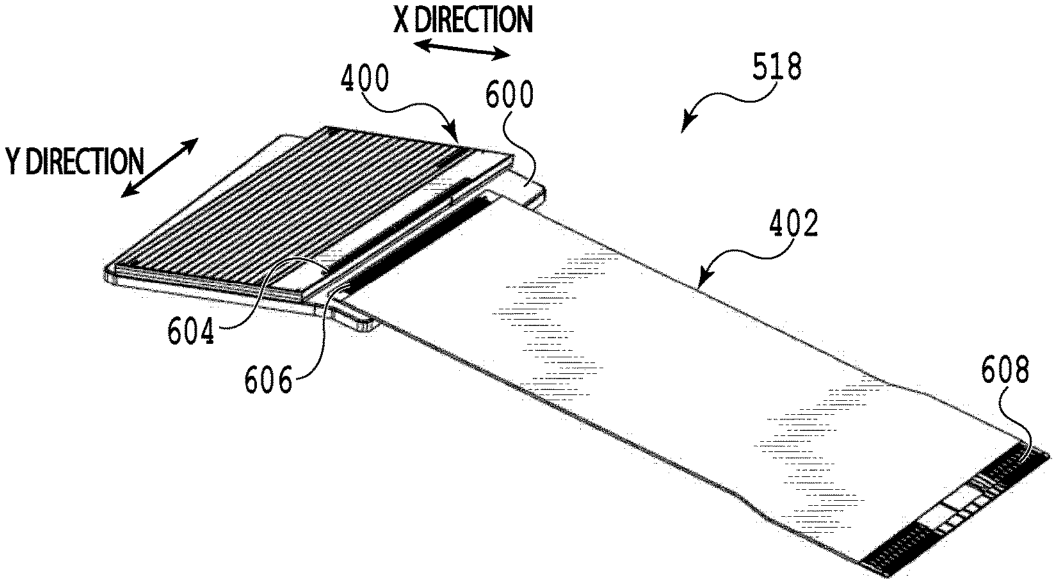
FIGS. 6A and 6B are schematic configuration diagrams of an ejection module.
Figure 6B:
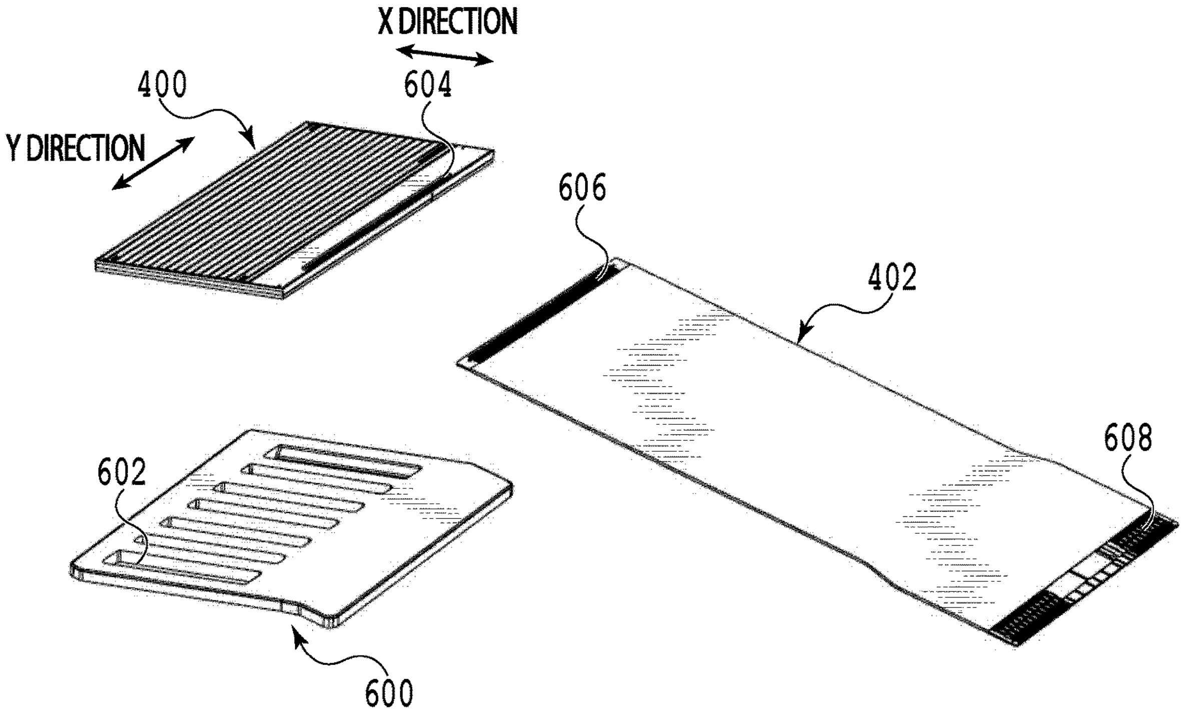

Next, the ejection module 518 will be described. FIGS. 6A and 6B are schematic configuration diagrams of the ejection module 518. FIG. 6A is a perspective configuration diagram of the ejection module 518, and FIG. 6B is an exploded view of the ejection module 518.

The ejection module 518 includes the element substrate 400 for ejecting ink, a support member 600 supporting the element substrate 400, and the flexible wiring board 402 connected to the element substrate 400 on the support member 600. The support member 600 has liquid communication openings 602 extending approximately in the X direction and arranged in the Y direction (see FIG. 6B). The number of liquid communication openings 602 formed in the support member 600, for example, corresponds to the number of communication openings 700 (described later) formed in the flow-path member 512. In other words, the support member 600 and the element substrate 400 are positioned on and joined to the flow-path member 512 such that each liquid communication opening 602 communicates with the corresponding communication opening 700 of the flow-path member 512.

The support member 600 not only serves as a support that supports the element substrate 400 but also serves as a flow-path member that fluidically connects the element substrate 400 and the flow-path member 512. Hence, the support member 600 should preferably be a member that has a high flatness and can be joined to the element substrate 400 with high reliability. The material should preferably be, for example, alumina or a resin material.

Terminals 604 located at a long side, extending approximately in the Y direction, of the element substrate 400 supported by the support member 600 are electrically connected by wire-bonding to terminals 606 located at an end portion of the flexible wiring board 402. The wire-bonded portions are covered and sealed with a sealing material (not illustrated). Terminals 608 at the other end portion of the flexible wiring board 402 are electrically connected to the connection terminals 404*a* of the electrical wiring board 404.

<Configuration of Flow-Path Member>

Figure 7A:
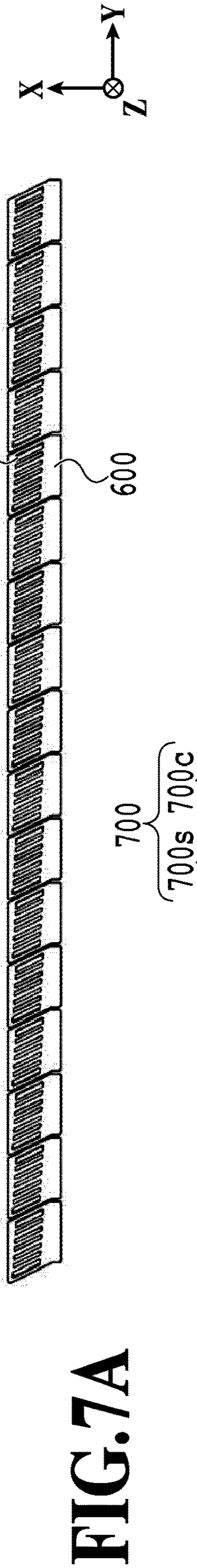
FIGS. 7A to 7D are schematic configuration diagrams of a flow-path member and support members.
Figure 7B:
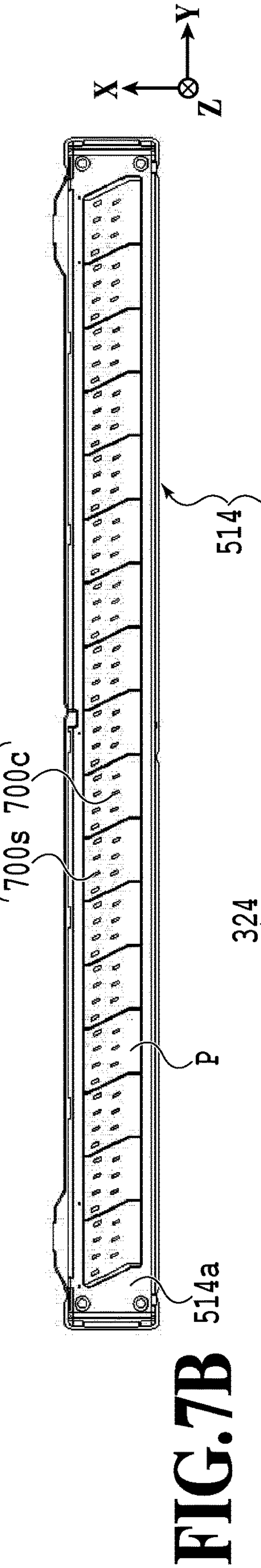
Figure 7C:
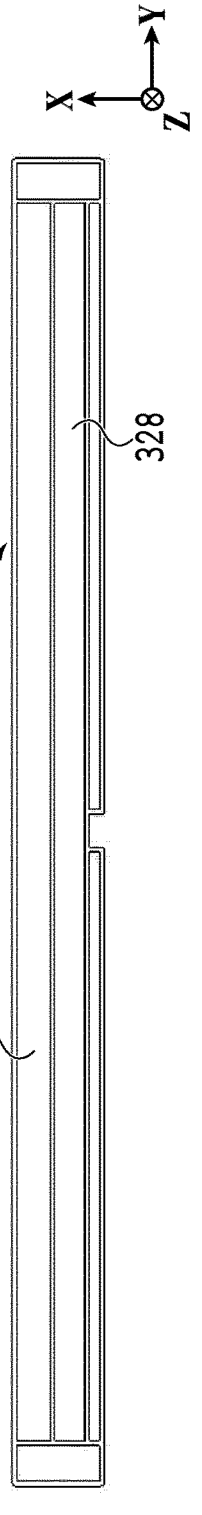
Figure 7D:
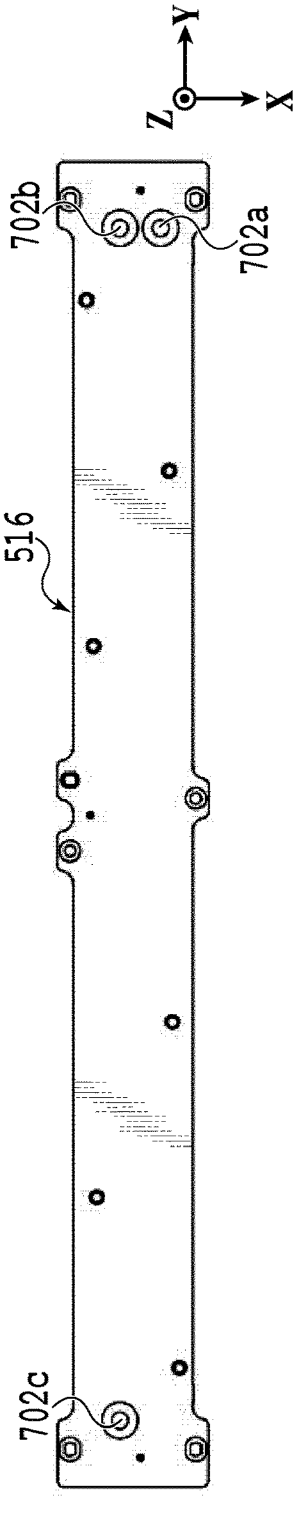

Next, the flow-path member 512 will be described in detail. FIGS. 7A to 7D are diagrams for explaining the configuration of the flow-path member 512 and the support members 600 which are joined to the flow-path member 512. FIG. 7A is a diagram illustrating the support members 600 which are joined to the flow-path member 512, and FIG. 7B is a diagram illustrating the joining surface 514*a* of the first flow-path member 514. FIG. 7C is a cross-sectional view of the first flow-path member 514 illustrated in FIG. 5 taken along line VIIC-VIIC, and FIG. 7D is a diagram illustrating the second flow-path member 516. FIGS. 7A to 7C are diagrams viewed from the first side in the Z direction (from below), and FIG. 7D is a diagram viewed from the second side in the Z direction (from above).

On the joining surface 514*a* of the first flow-path member 514, placement-position P on each of which one support member 600 can be placed are arranged side by side in the Y direction. The support member 600 of the ejection module 518, on which the element substrate 400 is joined, is placed on each placement-position P. This means that the element substrate 400 is located at each placement-position P with the support member 600 interposed therebetween. This configuration enables production of liquid ejecting heads 16 in various sizes in the Y direction by adjusting the number of ejection modules 518 arranged.

As illustrated in FIG. 7A, the support member 600 has the plurality of liquid communication openings 602 arranged in the Y direction, each liquid communication opening 602 being an elongated hole passing through the support member 600 in the Z direction and extending approximately in the X direction. In the present embodiment, the support member 600 has seven liquid communication openings 602, the number of which corresponds to the number of communication openings 700 formed in each placement-position P of the flow-path member 512. The support member 600 is connected to each placement-position P such that ink can be transferred through the liquid communication openings 602 between the flow paths provided in the element substrate 400 placed on the support member 600 and the corresponding communication openings 700 of the first flow-path member 514. In other words, the first flow-path member 514 and the element substrates 400 are fluidically connected via the support members 600.

Each placement-position P of the first flow-path member 514 has a plurality of the communication openings 700. The number of communication openings 700 corresponds to the number of opening rows Oc formed in a cover plate 908 (described later) of the element substrate 400 and is seven in the present embodiment. In each placement-position P, three communication openings 700 are arranged side by side approximately in the Y direction on the first side (on the lower side in FIG. 7B) in the X direction, and these three communication openings 700 are connected to the common collection flow path 328 formed in the first flow-path member 514 (see FIG. 7C). In the following, the communication openings 700 communicating with the common collection flow path 328 are referred to as communication openings 700*c* as appropriate. In addition, in each placement-position P, four communication openings 700 are arranged side by side approximately in the Y direction on the second side in the X direction (on the upper side in FIG. 7B), and these four communication openings 700 are connected to the common supply flow path 324 formed in the first flow-path member 514 (see FIG. 7C). In the following, the communication openings 700 communicating with the common supply flow path 324 are referred to as communication openings 700*s* as appropriate. The communication openings 700*s* and the communication openings 700*c* are located alternately in the Y direction.

As described above, each communication opening 700 connected to the common supply flow path 324 or the common collection flow path 328 is fluidically connected to a flow path of the element substrate 400 via the corresponding liquid communication opening 602. Thus, the flow paths provided in the element substrate 400 are connected to the common supply flow path 324 and the common collection flow path 328 via the corresponding liquid communication openings 602 and the corresponding communication openings 700. Hence, the liquid communication openings 602 and the communication openings 700 serve as parts of the individual supply flow paths 330*a* and individual collection flow paths 330*b* illustrated in FIG. 3.

The first flow-path member 514 has the common supply flow path 324 and the common collection flow path 328 formed inside (see FIG. 7C). Both the common supply flow path 324 and the common collection flow path 328 extend in the direction (the Y direction) in which the first flow-path member 514 extends. In the state in which the first flow-path member 514 and the second flow-path member 516 are joined to each other, a common communication opening 702*a* formed near the end portion of the second flow-path member 516 on the second side in the Y direction is located near the end portion of the common supply flow path 324 on the second side in the Y direction (on the right side in FIGS. 7A to 7D). In addition, a common communication opening 702*b* formed near the end portion of the second flow-path member 516 on the second side in the Y direction is located near the end portion of the common collection flow path 328 on the second side in the Y direction. Similarly, a common communication opening 702*c* formed near the end portion of the second flow-path member 516 on the first side in the Y direction (on the left side in FIGS. 7A to 7D) is located near the end portion of the common collection flow path 328 on the first side in the Y direction. The common communication opening 702*a* is connected to the supply path 322, the common communication opening 702*b* to the supply path 326, and the common communication opening 702*c* to a flow path communicating with the collection path 332 via the supply part 306 (see FIG. 3).

<Configuration of Element Substrate>

Figure 8A:
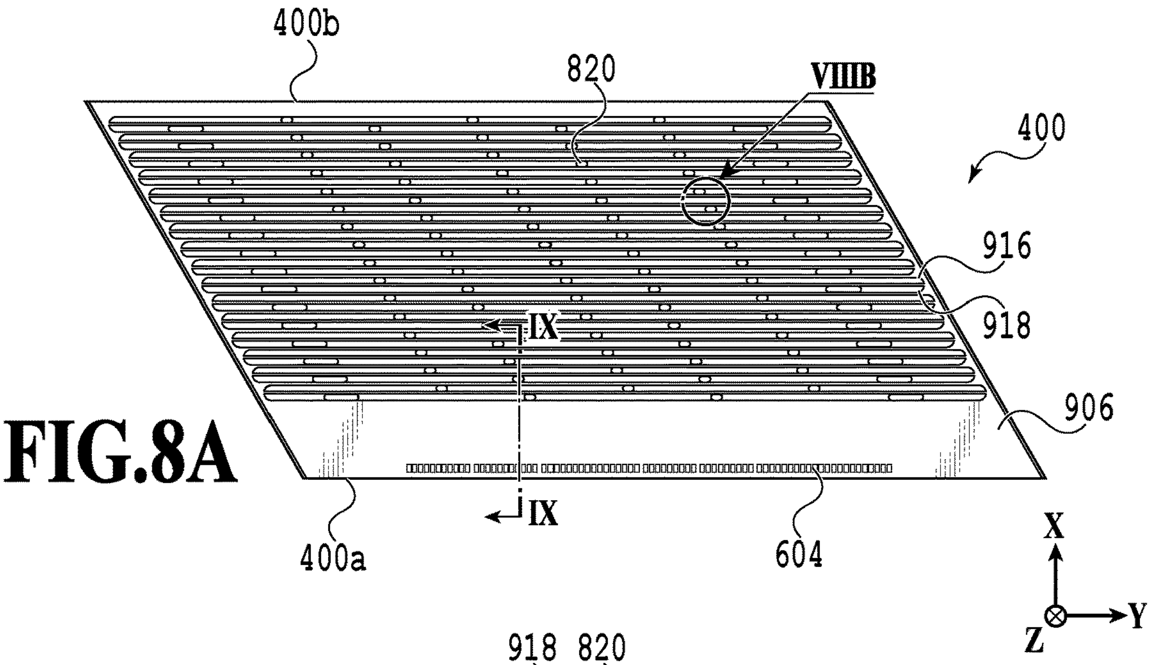
FIGS. 8A to 8C are schematic configuration diagrams of an element substrate.
Figure 8B:
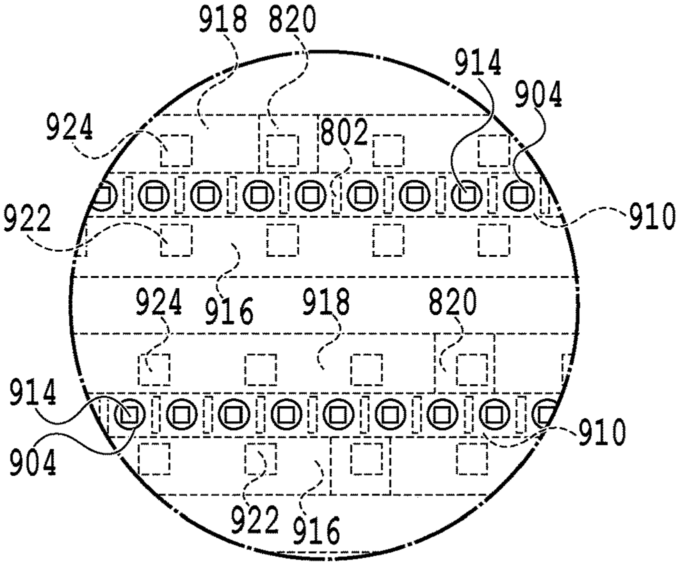
Figure 8C:
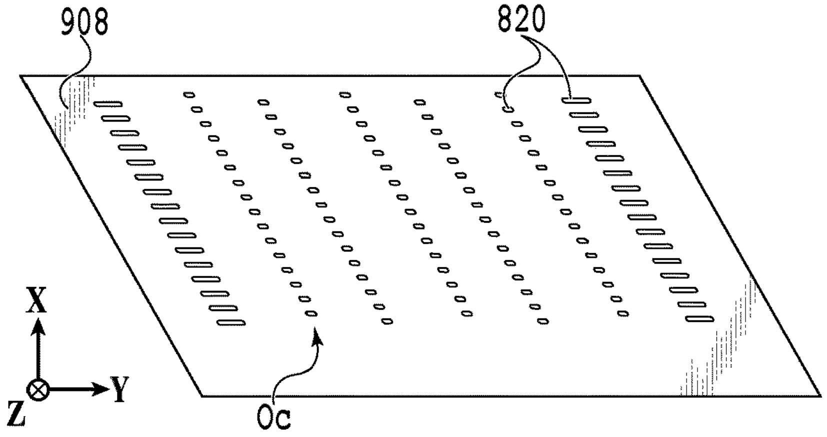
Figure 9:
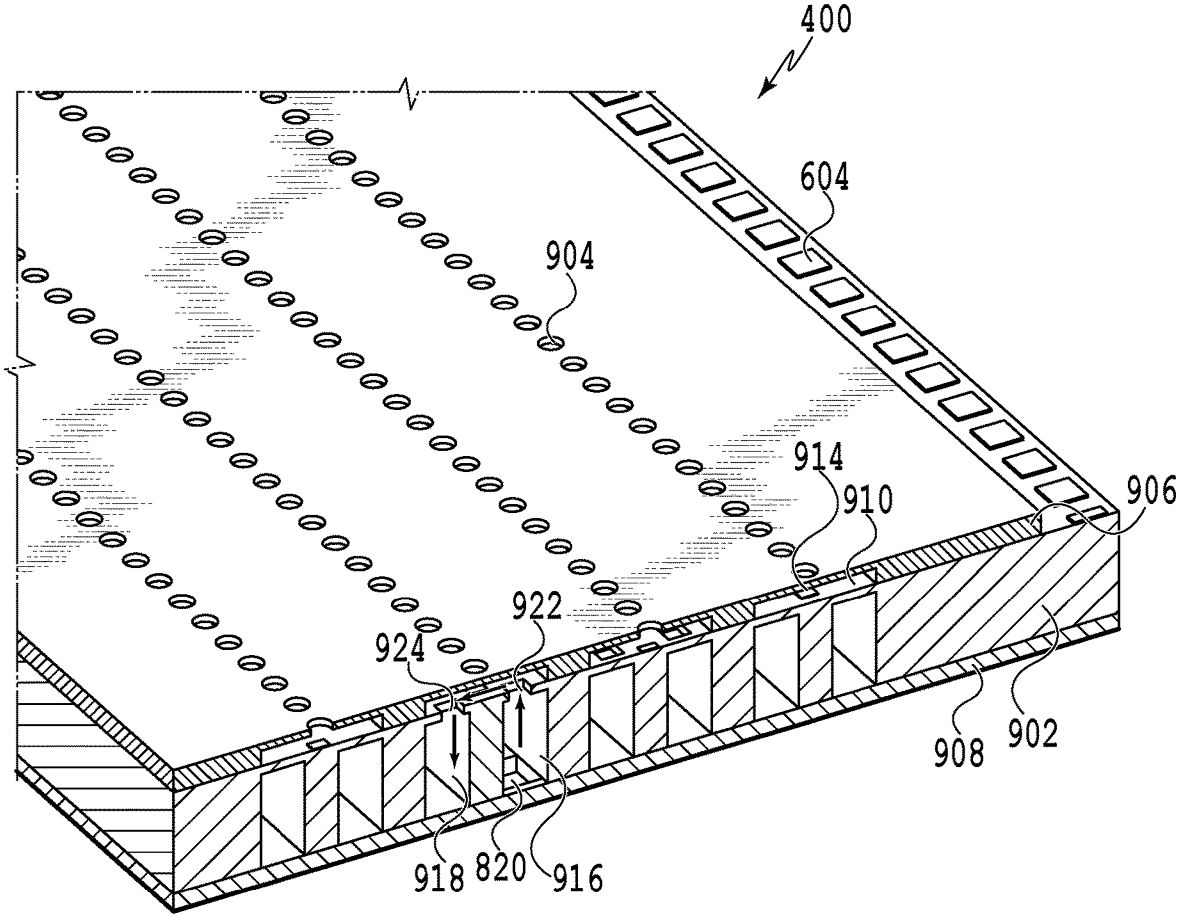
FIG. 9 is a cross-sectional view of the element substrate.

Next, the element substrate 400 will be described. FIGS. 8A to 9 are diagrams for explaining the configuration of the element substrate 400. FIG. 8A is a diagram illustrating the face of the element substrate 400 in which the ejection openings are formed. FIG. 8B is an enlarged view of the area within in the circle VIIIB in FIG. 8A. FIG. 8C is a diagram illustrating the cover plate 908 included in the element substrate 400. FIG. 9 is a cross-sectional view taken along line IX-IX in FIG. 8A. For easier understanding, FIG. 8A illustrates a transparent view of liquid supply paths, liquid collection paths, and openings provided in the element substrate 400.

As illustrated in FIG. 9, the element substrate 400 has a substrate 902, an ejection-opening forming member 906 formed on one surface of the substrate 902 and having the ejection openings 904, and the cover plate 908 joined to the other surface of the substrate 902. The substrate 902 is made of silicon (Si). The ejection-opening forming member 906 is formed of a photosensitive resin and stacked on the one surface of the substrate 902. The ejection-opening forming member 906 has a plurality of ejection opening rows that are arranged side by side in the X direction and in each of which a plurality of ejection openings 904 are arranged in the Y direction (see FIGS. 8B and 9). The ejection-opening forming member 906 has a pressure chamber 910 at a position corresponding to each ejection opening 904, and each pressure chamber 910 is separated by partition walls 802 (see FIG. 8B).

The cover plate 908 has the opening rows Oc which are arranged side by side in the Y direction and in each of which a plurality of openings 820 are arranged so as to be inclined to the X direction (see FIGS. 8A and 8C). The inclination angle of each opening row Oc corresponds to the inclination angle of the liquid communication openings 602 with which each opening 820 communicates in the state in which the element substrate 400 is joined to the support member 600. The openings 820 in adjacent opening rows Oc are shifted relative to one another in the X direction by a specified distance. The cover plate 908 should preferably have sufficient corrosion resistance against ink, and the openings 820 need to be formed with high accuracy in terms of the opening shapes and the opening positions. For this reason, it is preferable that a photosensitive resin material or a silicon plate be used to form the cover plate 908, and that the openings 820 be formed by a photolithography process.

At the position corresponding to each ejection opening 904 in each pressure chamber 910 on the one surface of the substrate 902, the heat generation element 914 is provided as a print element (energy generation element) capable of generating energy for ejecting liquid through the ejection opening. The substrate 902 has a liquid supply path 916 and a liquid collection path 918 formed at positions corresponding to each ejection opening row and extending in the direction in which the ejection opening row extends. Specifically, along each ejection opening row, the liquid supply path 916 is located on the first side of the ejection opening row in the X direction, and the liquid collection path 918 is located on the second side of the ejection opening row in the X direction.

The liquid supply path 916 is connected via a supply opening 922 to the pressure chamber 910 formed in the ejection-opening forming member 906 on the one surface of the substrate 902, and the liquid collection path 918 is connected via a collection opening 924 to the pressure chamber 910 on the one surface of the substrate 902. The liquid supply path 916 and the liquid collection path 918 communicate with the openings 820 in the state in which the cover plate 908 is joined to the substrate 902. In the present embodiment, the liquid supply path 916 communicates with the openings 820 in the odd numbered opening rows Oc in the Y direction of the cover plate 908, and the liquid collection path 918 communicates with the openings of the even numbered opening rows Oc. Hence, each liquid supply path 916 communicates with four openings 820, and each liquid collection path 918 communicates with three openings 820.

Although details will be described later, each liquid supply path 916 is connected to the common supply flow path 324, and each liquid collection path 918 is connected to the common collection flow path 328. Hence, there is a pressure difference between the liquid supply path 916 and the liquid collection path 918. Thus, in the case where printing is being performed by ejecting ink through the ejection openings 904, in the ejection openings not ejecting ink, this pressure difference causes ink to flow from the liquid supply path 916, through the supply opening 922, the pressure chamber 910, and the collection opening 924 into the liquid collection path 918 (see arrows in FIG. 9).

The flow of ink described above enables thickened ink, bubbles, foreign objects, and the like in the ejection openings 904 not ejecting ink and the pressure chambers 910 associated with these ejection openings to be collected into the liquid collection path 918. In addition, it is possible to prevent thickening of ink and an increase in the concentration of the coloring material in the ejection openings 904 and the pressure chambers 910. Although details will be described later, the ink collected into the liquid collection path 918 is transferred to openings 820 of the cover plate 908.

The heat generation element 914 uses thermal energy to generate a bubble in ink, and this foaming pressure ejects ink in the pressure chamber 910 through the ejection opening 904. Specifically, the heat generation element 914 is electrically connected to the terminals 604 located near the end portion of the substrate 902 with electrical wiring (not illustrated) provided in the element substrate 400. The heat generation element 914 generates heat to boil ink in response to a pulse signal inputted from the controller 200 via the electrical wiring board 404 and the flexible wiring board 402, and the force generated by foaming due to this boiling ejects ink in the pressure chamber 910 through the ejection opening 904.

<Flow Paths in Element Substrate and Flow Paths in Flow-Path Member>

Figure 10A:
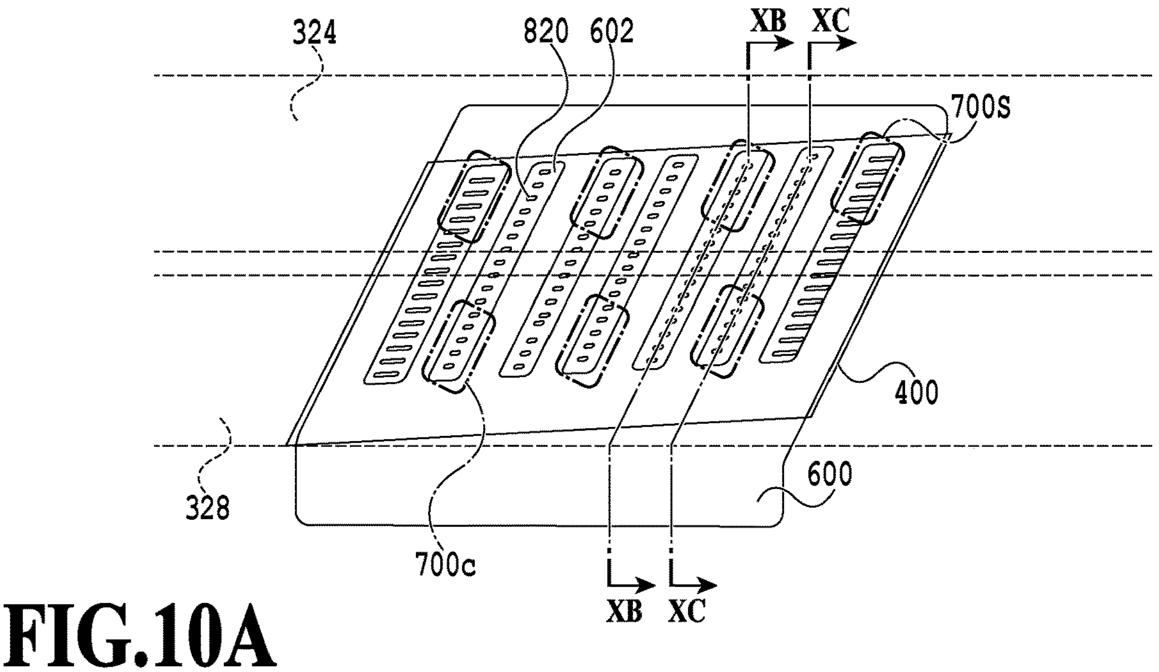
FIGS. 10A to 10C are diagrams for explaining the relationship of connections between flow paths in the element substrate and flow paths in the flow-path member.
Figure 10B:
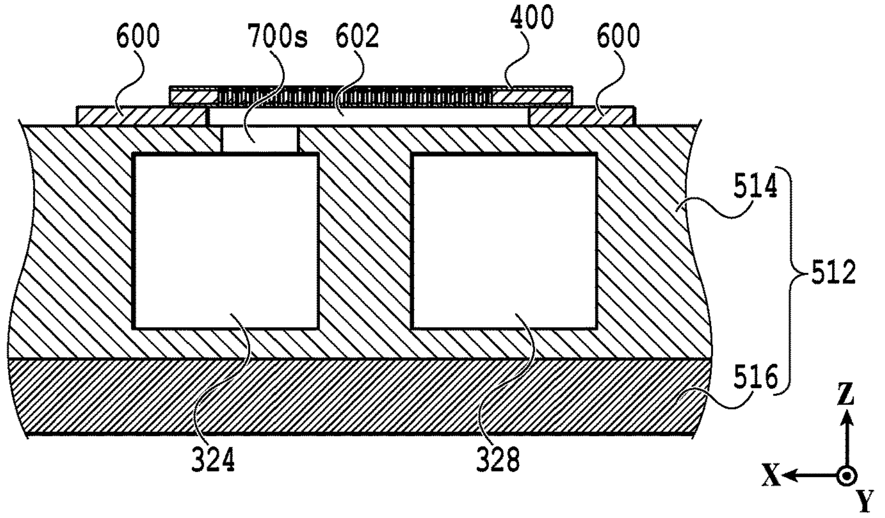
Figure 10C:
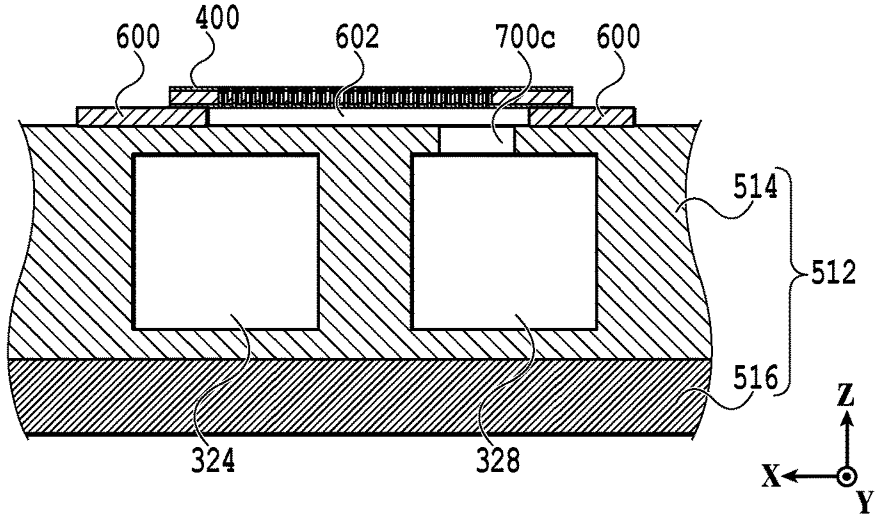

Next, a description will be given of part of the flow-path configuration of the circulation system 300 composed of the flow paths formed in the element substrate 400 and the flow paths in the flow-path member 512. FIGS. 10A to 10C are diagrams illustrating part of the flow-path configuration of the circulation system 300 formed in the element substrate 400 and the flow-path member 512. FIG. 10A is a transparent view of the support member 600 and the element substrate 400 placed on the placement-position P, seen from the second side in the Z direction (from above). FIG. 10B is a cross-sectional view taken along line XB-XB in FIG. 10A. FIG. 10C is a cross-sectional view taken along line XC-XC in FIG. 10A. For easier understanding, in FIG. 10A, certain parts of the structures are depicted with dashed lines and dashed dotted lines.

The element substrate 400 is joined to the support member 600 such that each opening 820 of each opening row Oc is positioned in the corresponding liquid communication opening 602. In the case where the ejection module 518 is placed on the placement-position P, the support member 600 to which the element substrate 400 is joined is placed such that each liquid communication opening 602 communicates with the corresponding communication opening 700 provided in the placement-position P of the first flow-path member 514 (see FIG. 10A). With this configuration, each opening 820 in each odd numbered opening row Oc communicates via the corresponding liquid communication opening 602 with the corresponding communication opening 700*s* communicating with the common supply flow path 324 (see FIG. 10B). Similarly, each opening 820 in each even numbered opening row Oc communicates via the corresponding liquid communication opening 602 with the corresponding communication opening 700*c* communicating with the common collection flow path 328 (see FIG. 10C).

Thus, the ejection part 304 with the element substrates and the flow-path member has an ink supply path in which ink passes through the common supply flow path 324, the communication openings 700*s*, the liquid communication openings 602, the openings 820, the liquid supply paths 916, and the supply openings 922 in this order and is supplied to the pressure chambers. The communication openings 700*s* and the liquid communication openings 602 in this ink supply path correspond to the individual supply flow paths 330*a* provided between the common supply flow path 324 and the element substrates 400 (see FIG. 3). The ejection part 304 also has an ink collection path for collecting ink from the pressure chambers through the collection openings 924, the liquid collection paths 918, the openings 820, the liquid communication openings 602, the communication openings 700*c*, and the common collection flow path 328 in this order. The communication openings 700*c* and the liquid communication openings 602 in this ink collection path correspond to the individual collection flow paths 330*b*.

<Heating Mechanism in Element Substrate>

Each element substrate 400 includes a plurality of temperature sensors 214 and a plurality of sub-heaters 216 (see FIG. 2). Although illustration is omitted, each of the sub-heaters 216 is located in each of the areas into which the region including the ejection openings 904 in the element substrate 400 is divided. This area has at least one of the temperature sensors 214. The temperature sensors 214 and the sub-heaters 216 are connected to the controller 200 via an electrical circuit formed in the element substrate 400, an electrical circuit formed in the flexible wiring board 402, and the like. In a case where the temperature detected by a temperature sensor 214 falls below a set temperature range, the controller 200 drives the sub-heater 216 of the area associated with this temperature sensor 214 to heat the area. In a case where the temperature detected by a temperature sensor 214 exceeds the set temperature range, the controller 200 stops driving the sub-heater 216 of the area associated with this temperature sensor 214 to stop heating the area.

This configuration enables the temperature of the region where the ejection openings 904 are formed in the element substrate 400 to be adjusted within the set range in units of the areas. Maintaining the temperature of the element substrate 400 within the set temperature range decreases the viscosity of ink in the element substrate 400 and enables suitable ink ejection and circulation. The temperature control described above reduces temperature variations among the plurality of element substrates 400, thereby reducing variations in ejection volume caused by temperature among the element substrates 400 and preventing the degradation of print quality.

The set temperature of the element substrate 400 should preferably be, for example, a temperature higher than or equal to the equilibrium temperature of the element substrate 400 in the case where all of the heat generation elements 914 are driven at the estimated highest drive frequency. Note that the temperature sensor 214 is, for example, a diode sensor. The heating mechanism of the element substrate 400 is not limited to configurations including the sub-heaters 216. A configuration in which the heat generation elements 914 are used for the heating mechanism is possible. Specifically, a voltage at such a degree that does not generate a bubble is applied to the heat generation element 914 to heat the area associated with the element substrate 400. As another configuration, both the sub-heaters 216 and the heat generation elements 914 may be used as the heating mechanism of the element substrate 400.

<Unevenness of Temperature in Element Substrate>

Next, unevenness of temperature caused in the element substrate will be described. Ink is supplied to the element substrate 400 through the common supply flow path 324, the communication openings 700*s*, and the liquid communication openings 602 (see FIG. 10B). The temperature of the element substrate 400 during printing increases along with the temperature of the ink in the element substrate 400 due to the heat generation of the heat generation elements 914 and the sub-heaters 216. Hence, the temperature of the ink flowing from the common supply flow path 324 into the element substrate 400 is lower than the temperature of the element substrate 400.

Since ink with a relatively low temperature flows from the common supply flow path 324 through the communication openings 700*s* into the element substrate 400, portions of the element substrate 400 near the openings 820 that the ink flows into are cooled. For this reason, temperature difference occurs between portions near the openings 820 and portions away from these openings 820. This temperature difference causes ink viscosity difference, making difference in ink ejection volume between ejection openings near the openings 820 that ink flows into and ejection openings away from these openings 820.

<Characteristic Configuration of Present Embodiment>

Here, as illustrated in FIG. 8A, the region where the ejection openings 904 are formed in the element substrate 400 (hereinafter also referred to as "ejection region" as appropriate) is shifted from the long side 400*a* on one side, where the terminals 604 are located, to the long side 400*b* on the other side. Since the sub-heaters 216 and the heat generation elements 914 are located in this ejection region, heating effects are high. Unlike the ejection region, since the sub-heaters 216 and the heat generation elements 914 are not located in the regions where the ejection openings 904 are not formed (hereinafter also referred to as "non-ejection region" as appropriate), heating effects are low, and heat is dissipated. These non-ejection regions are located on either side of the ejection region in the X direction. The non-ejection region on the first side in the X direction along which the long side 400*a* is located is larger than the non-ejection region on the second side in the X direction along which the long side 400*b* is located. Hence, in the element substrate 400, heat dissipation is promoted more in portions near the long side 400*a* than in portions near the long side 400*b*, and thus the portions near the long side 400*a* are more likely to be cooled. In other words, of the two non-ejection regions having low heating effects, the non-ejection region near the long side 400*a* has a lower heating effect than the non-ejection region near the long side 400*b*.

Figure 11:
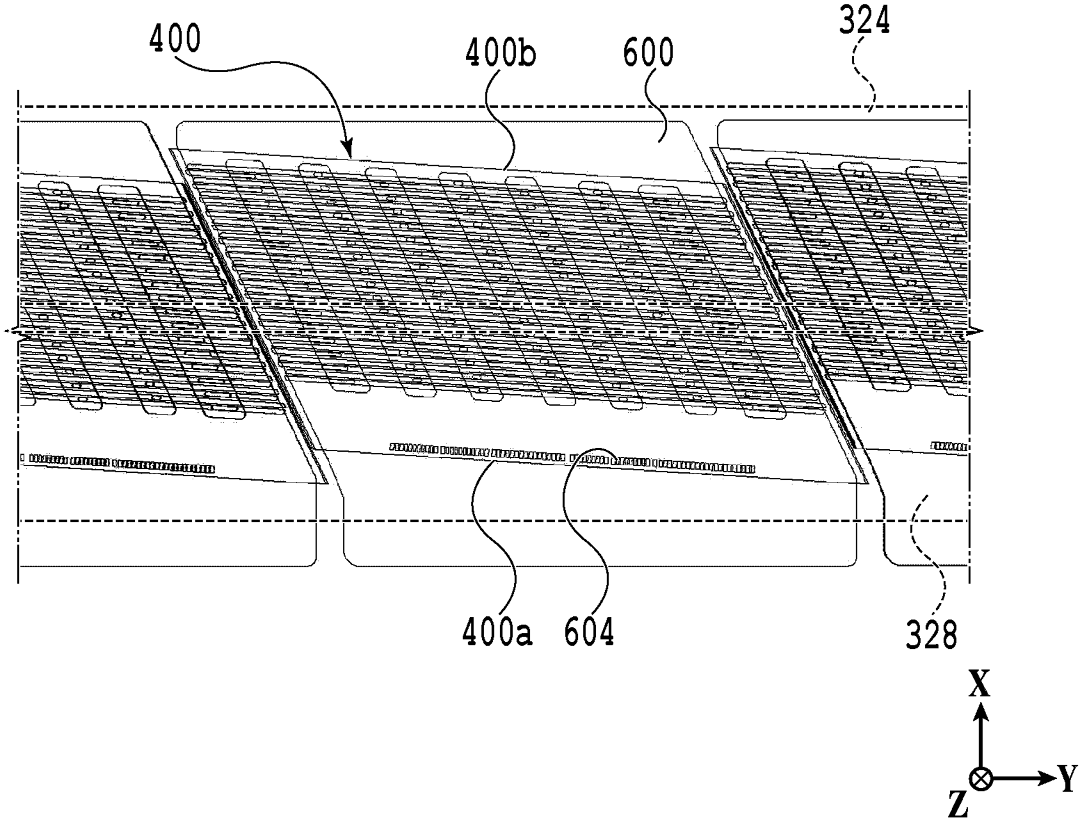
FIG. 11 is a diagram illustrating the element substrate located at the bottom face of the flow-path member.

Hence, in the present embodiment, the element substrate 400 is placed on the placement-position P such that the long side 400*a* of the element substrate 400 along which the larger non-ejection region is formed is located on the common collection flow path 328 side, and the long side 400*b* of the element substrate 400 along which the smaller non-ejection region is formed is located on the common supply flow path 324 side (see FIG. 11). In addition, the element substrate 400 is placed on the placement-position P such that the ejection region is shifted to the long side 400*b* so as to be larger on the common supply flow path 324 side than on the common collection flow path 328 side. FIG. 11 is a diagram illustrating the ejection module 518 placed on the flow-path member 512. FIG. 11 is a diagram viewed from the first side in the Z direction.

With this configuration of the element substrate 400, the ink from the common supply flow path 324 flows into portions closer to the long side 400*b* having relatively high heating effects, and ink flows out into the common collection flow path 328 from portions closer to the long side 400*a* having relatively low heating effects. In other words, in the element substrate 400, ink having a relatively low temperature flows into the region having a relatively high heating effect, and ink having a relatively high temperature flows out of the region having a low heating effect. This configuration reduces the temperature difference caused in ink circulation in the circulation system 300 between portions of the element substrate 400 near the positions at which ink flows into and the other positions, thereby making the temperature of the element substrate 400 uniform.

Figure 12:
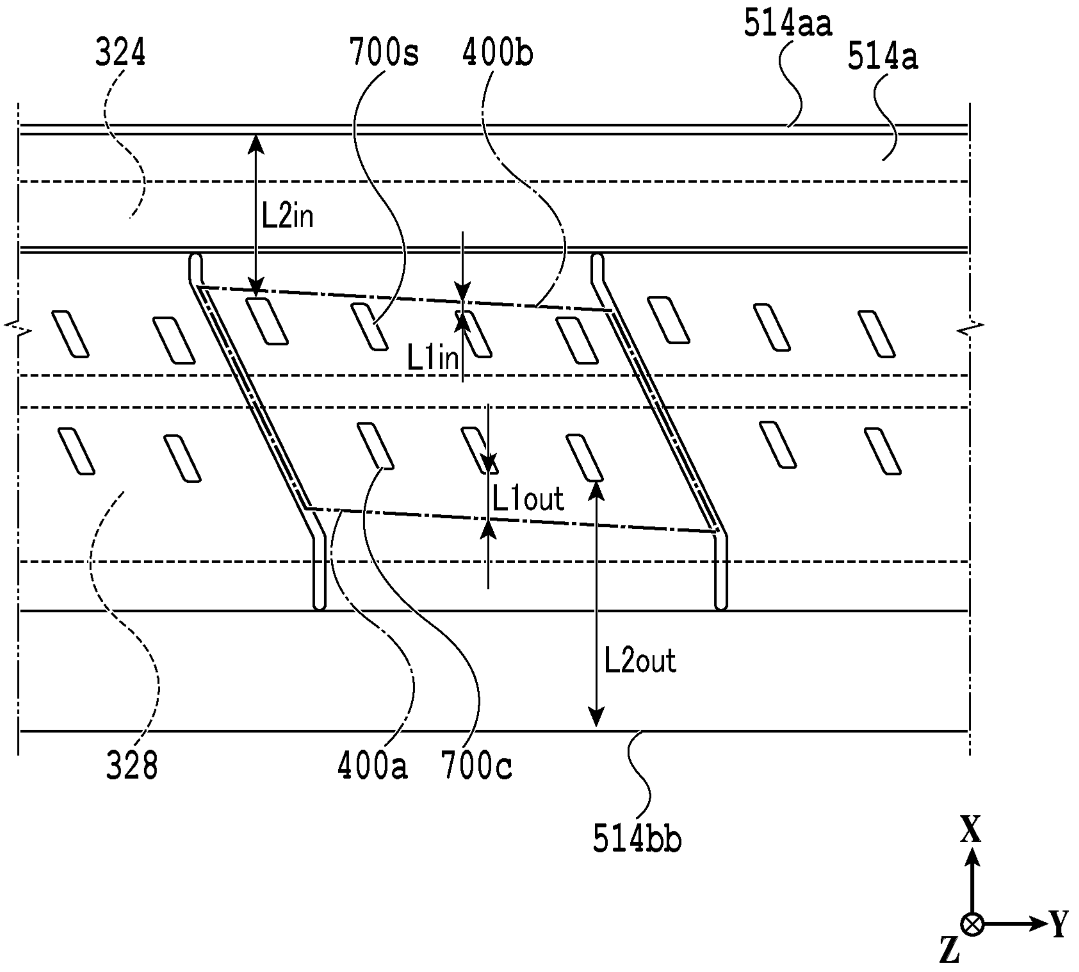
FIG. 12 is a diagram illustrating an example of a placement-position, for the element substrate, at the bottom face of the flow-path member.

The positions of the communication openings 700 formed in the placement-position P of the flow-path member 512 have, for example, the following relationship. Specifically, the relationship L1in<L1out holds, where L1in is the minimum distance between the communication openings 700*s* communicating with the common supply flow path 324 and the long side 400*b*, and L1out is the minimum distance between the communication openings 700*c* communicating with the common collection flow path 328 and the long side 400*a* (see FIG. 12). FIG. 12 is a diagram for explaining the positions in the X direction of the communication openings 700*s* and 700*c* formed in the placement-position P. In addition, the relationship L2in<L2out holds, where L2in is the minimum distance between the communication openings 700*s* communicating with the common supply flow path 324 and the end portion 514*aa* of the bottom surface 514*a* on the second side in the X direction, and L2out is the minimum distance between the communication openings 700*c* communicating with the common collection flow path 328 and the end portion 514*ab* of the bottom surface 514*a* on the first side in the X direction.

Note that the minimum distance between the communication openings 700*s* (700*c*) and the corresponding long side 400*b* (400*a*) refers to the distance between the long side 400*b* (400*a*) and the communication opening 700*s* (700*c*) closest to the corresponding long side 400*b* (400*a*) out of the plurality of communication openings 700*s* (700*c*). The minimum distance between the communication openings 700*s* (700*c*) and the corresponding end portion 514*aa* (514*ab*) refers to the distance between the end portion 514*aa* (514*ab*) and the communication opening 700*s* (700*c*) closest to the corresponding end portion 514*aa* (514*ab*) out of the plurality of communication openings 700*s* (700*c*). With this configuration, the communication openings 700*s* communicating with the common supply flow path 324 and the communication openings 700*c* communicating with the common collection flow path 328 are located approximately symmetrically with respect to the set of ejection opening rows.

Operational Advantages

As described above, in the liquid ejecting head 16, the element substrate 400 is placed on the placement-position P of the flow-path member 512 such that out of the non-ejection regions having low heating effects and located on either side of the ejection region in the X direction, the non-ejection region having a relatively low heating effect is located on the common collection flow path side. In addition, the element substrate 400 is placed on the placement-position P such that a larger region of the ejection region having high heating effects in the element substrate 400 is located on the common supply flow path 324 side.

With this configuration of the element substrate 400, ink having a relatively low temperature flows into the region having a high heating effect, and ink having relatively high temperature flows out of the region having a low heating effect. This makes the temperature of the element substrate 400 uniform. Thus, this configuration reduces temperature variations in circulating ink between portions near the positions at which ink flows into the element substrate 400 and the other positions, thereby reducing variations in ink ejection volume.

Other Embodiments

Figure 13A:
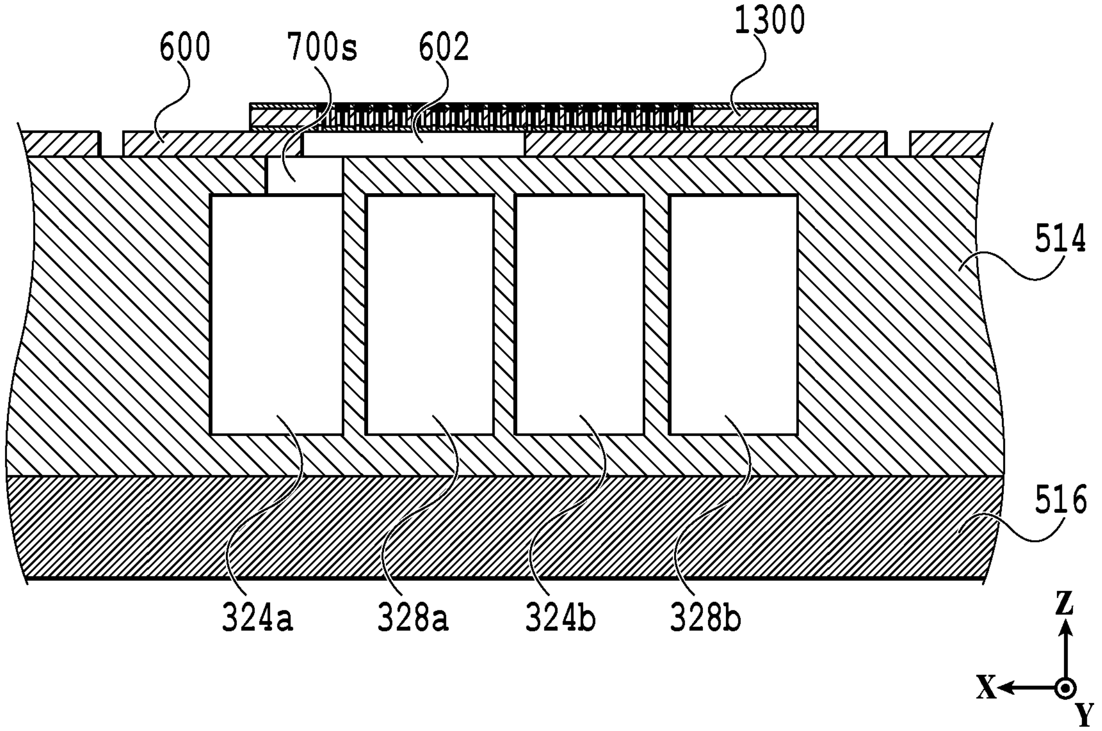
FIGS. 13A and 13B are diagrams illustrating a modification example of a liquid ejecting head.
Figure 13B:
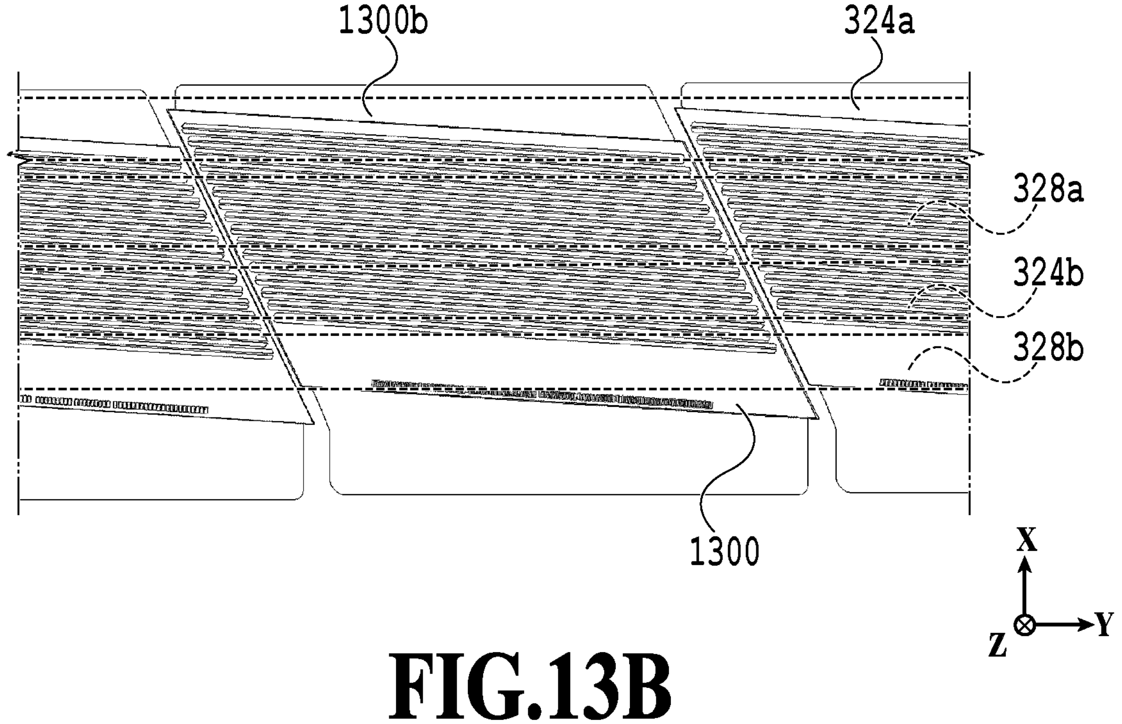

Although the above embodiment is based on the configuration in which the liquid ejecting head 16 ejects one kind of ink, the present disclosure is not limited to this configuration. A configuration in which the liquid ejecting head 16 ejects a plurality of kinds of ink is possible. Although the following description is based on an example in which a liquid ejecting head ejects two kinds of ink, a configuration capable of ejecting three or more kinds of ink is possible. FIGS. 13A and 13B are diagrams for explaining a liquid ejecting head that ejects two kinds of ink. FIG. 13A is a cross-sectional view of the liquid ejecting head, corresponding to FIG. 10B, and FIG. 13B is a diagram illustrating an element substrate placed on a placement-position P of the liquid ejecting head. In FIGS. 13A and 13B, a common supply flow path 324*a* for one kind of ink, a common collection flow path 328*a* for the one kind of ink, a common supply flow path 324*b* for the other kind of ink, and a common collection flow path 328*b* for the other kind of ink are located from the second side toward the first side in the X direction. Portions near the common supply flow path 324*a* located closer to an end portion of an element substrate 1300 are more likely to reduce the temperature of the element substrate 1300 locally. Hence, placement of the element substrate 1300 such that a larger part of the heating region is located near the long side 1300*b* on the second side makes the temperature of the circulating ink in the element substrate 1300 uniform.

Although the heat generation element 914 is used as the print element in the above embodiment, the present disclosure is not limited to this configuration. On the assumption in which sub-heaters 216 are used, a publicly-known energy generation element, such as a piezo element, capable of generating energy for ejecting ink through the ejection opening may be used as the print element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-209970, filed Dec. 27, 2022, which is hereby incorporated by reference herein in its entirety.

What is claimed is:

1. A liquid ejecting head comprising:

an ejection opening row including a plurality of ejection openings configured to eject liquid;

a liquid supply path to supply liquid to the plurality of ejection openings;

a liquid collection path to collect liquid not ejected through the plurality of ejection openings;

energy generation elements configured to generate energy to eject liquid through the ejection openings;

a common supply flow path to supply liquid to a plurality of liquid supply paths;

a common collection flow path to collect liquid from a plurality of liquid collection paths; and a heating unit configured to heat an ejection region including the ejection openings, wherein, on sides of the ejection region with respect to a predetermined direction intersecting an arrangement direction of the ejection openings, a first non-ejection region and a second non-ejection region are provided, with the first non-ejection region being located on a first side and the second non-ejection region being located on a second side, the ejection region is located so as to be shifted toward the second non-ejection region, as viewed from a direction orthogonal to a surface having the ejection opening row, there are a first overlap region in which the first non-ejection region and the common collection flow path at least partially overlap each other and a second overlap region in which the second non-ejection region and the common supply flow path at least partially overlap each other, and an area of the first overlap region is larger than an area of the second overlap region.

2. The liquid ejecting head according to claim 1, further comprising:

a substrate including the ejection opening row, the liquid supply path, the liquid collection path, and the energy generation elements; and a flow-path member supporting the substrate and having the common supply flow path and the common collection flow path.

3. The liquid ejecting head according to claim 2, wherein the substrate has a terminal for being electrically connected to the outside, on the first side in the predetermined direction.

4. The liquid ejecting head according to claim 2, wherein the substrate is placed on the flow-path member with a support member interposed therebetween, the support member supporting the substrate and including liquid communication openings fluidically connected to the substrate and the flow-path member, in the flow-path member, a first communication opening connecting the common supply flow path and one of the liquid communication openings is located on one side of the substrate in the predetermined direction, and a second communication opening connecting the common collection flow path and the other of the liquid communication openings is located on other side of the substrate in the predetermined direction.

5. The liquid ejecting head according to claim 4, wherein the distance between the first communication opening and a first end portion of the substrate on the one side in the predetermined direction is shorter than the distance between the second communication opening and a second end portion of the substrate on the other side in the predetermined direction.

6. The liquid ejecting head according to claim 4, wherein the distance between the first communication opening and a third end portion of the flow-path member on the one side in the predetermined direction is shorter than the distance between the second communication opening and a fourth end portion of the flow-path member on the other side in the predetermined direction.

7. The liquid ejecting head according to claim 1, wherein the energy generation elements are heat generation elements, and the heating unit is either a heater configured to operate according to the temperature of the substrate or the heat generation elements which operate without ejecting liquid through the ejection openings according to the temperature, or both.

8. The liquid ejecting head according to claim 1, wherein the liquid ejecting head is configured to eject one kind of liquid.

9. The liquid ejecting head according to claim 1, wherein the flow-path member supports a plurality of substrates.

10. The liquid ejecting head according to claim 9, wherein the flow-path member extends in the arrangement direction, and the common supply flow path and the common collection flow path extend in the arrangement direction.

11. The liquid ejecting head according to claim 1, further comprising:

a first opening row in which a plurality of first openings that are openings to supply liquid to the plurality of liquid supply paths from the common supply flow path and that individually correspond to the liquid supply paths are arranged in the predetermined direction; and a second opening row in which a plurality of second openings that are openings to collect liquid from the plurality of liquid collection paths to the common collection flow path and that individually correspond to the liquid collection paths are arranged in the predetermined direction, and wherein all of the plurality of first openings corresponding to the liquid supply paths are included in the first opening row, and all of the plurality of second openings corresponding to the liquid collection paths are included in the second opening row.

12. The liquid ejecting head according to claim 11, wherein the liquid ejecting head includes a plurality of the first opening rows and a plurality of the second opening rows, and the first opening rows and the second opening rows are alternately located in the arrangement direction.

13. The liquid ejecting head according to claim 12, wherein the first opening rows are located at both ends in the arrangement direction.

14. A liquid ejecting apparatus comprising:

a liquid ejecting head including an ejection opening row including a plurality of ejection openings configured to eject liquid, a liquid supply path to supply liquid to the plurality of ejection openings, a liquid collection path to collect liquid not ejected through the plurality of ejection openings, energy generation elements configured to generate energy to eject liquid through the ejection openings, a common supply flow path to supply liquid to a plurality of liquid supply paths, a common collection flow path to collect liquid from a plurality of liquid collection paths, and a heating unit configured to heat an ejection region including the ejection openings; and a circulation system configured to supply liquid from a tank for storing liquid to the liquid ejecting head and transfer liquid collected from the liquid ejecting head to the tank, wherein on sides of the ejection region with respect to a predetermined direction intersecting an arrangement direction of the ejection openings, a first non-ejection region and a second non-ejection region are provided, with the first non-ejection region being located on a first side and the second non-ejection region being located on a second side, the ejection region is located so as to be shifted toward the second non-ejection region, as viewed from a direction orthogonal to a surface having the ejection opening row, there are a first overlap region in which the first non-ejection region and the common collection flow path at least partially overlap each other and a second overlap region in which the second non-ejection region and the common supply flow path at least partially overlap each other, and an area of the first overlap region is larger than an area of the second overlap region.

* * * * *